(12) United States Patent
Fan et al.

(10) Patent No.: US 10,588,151 B2
(45) Date of Patent: Mar. 10, 2020

(54) SPATIAL LISTEN BEFORE TALK BY PRECODED REQUEST TO SEND AND CLEAR TO SEND VIA WHITENING

(71) Applicant: QUALCOMM Incorporated, San Diego, CA (US)

(72) Inventors: Zhifei Fan, San Diego, CA (US); Taesang Yoo, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/969,625

(22) Filed: May 2, 2018

(65) Prior Publication Data

US 2019/0021116 A1    Jan. 17, 2019

Related U.S. Application Data

(60) Provisional application No. 62/531,780, filed on Jul. 12, 2017.

(51) Int. Cl.
*H04W 74/08* (2009.01)
*H04B 7/0456* (2017.01)
*H04W 16/14* (2009.01)

(52) U.S. Cl.
CPC ...... *H04W 74/0816* (2013.01); *H04B 7/0486* (2013.01); *H04W 16/14* (2013.01)

(58) Field of Classification Search
CPC .. H04B 7/0452; H04B 7/0482; H04B 7/0639; H04B 7/065; H04B 7/0486; H04W 16/14;
(Continued)

(56) References Cited

U.S. PATENT DOCUMENTS

2007/0232235 A1    10/2007 Li et al.
2009/0274074 A1*   11/2009 Astely .................. H04B 7/0619
                                                                370/280
(Continued)

OTHER PUBLICATIONS

Chen B-S., et al., "Multiplexing-Diversity Medium Access for Multi-User MIMO Networks", IEEE Transactions on Mobile Computing, IEEE Service Center, Los Alamitos, CA, US, vol. 15, No. 5, May 1, 2016 (May 5, 2016), pp. 1211-1223, XP011605048, ISSN: 1536-1233, DOI: 10.1109/TMC.2015.2450744 [retrieved on Apr. 1, 2016].

(Continued)

*Primary Examiner* — Michael Thier
*Assistant Examiner* — Prince A Mensah
(74) *Attorney, Agent, or Firm* — Liem T. Do

(57) ABSTRACT

Methods, systems, and devices for wireless communication are described. A first wireless device may receive a clear to send signal based precoded based at least in part on a receive filter at a second wireless device. The first wireless device may calculate a transmit precoder based at least in part on the clear to send signal. For example, the first wireless device may calculate a whitening filter and a second filter based at least in part on the clear to send signal. The first wireless device may transmit a request to send signal precoded by the transmit precoder to initiate communications with a third wireless device without significantly interfering with ongoing communications at the second wireless device.

47 Claims, 19 Drawing Sheets

(58) Field of Classification Search
CPC ......... H04W 74/0808; H04W 74/0816; H04W 74/085
See application file for complete search history.

(56) References Cited

U.S. PATENT DOCUMENTS

| | | | |
|---|---|---|---|
| 2011/0075650 A1* | 3/2011 | Zhu | H04L 25/0246 370/344 |
| 2011/0222398 A1* | 9/2011 | Ribeiro | H04W 74/0816 370/230 |
| 2012/0213177 A1* | 8/2012 | Lee | H04W 52/0216 370/329 |
| 2013/0324136 A1* | 12/2013 | Hirata | H04W 16/32 455/447 |
| 2015/0327291 A1* | 11/2015 | Zhou | H04B 7/0617 370/329 |
| 2016/0329942 A1* | 11/2016 | Zhu | H04L 25/03898 |

OTHER PUBLICATIONS

International Search Report and Written Opinion—PCT/US2018/037920—ISA/EPO—dated Sep. 11, 2018 (174653WO).
Qualcomm Incorporated: "Channel Access Procedures for NR Unlicensed", 3GPP Draft; R1-1807389, 7.6.4.1 Channel Access Procedures for NR Unlicensed, 3rd Generation Partnership Project (3GPP), Mobile Competence Centre; 650, Route Des Lucioles; F-06921 Sophia-Antipolis CED, vol. RAN WG1, no. Busan, Korea; 20180521-20180525, May 12, 2018 (May 12, 2018), pp. 1-9, XP051463080, Retrieved from the Internet: URL: http://www.3gpp.org/ftp/tsg%5Fran/WG1%5FRL1/TSGR1%5F93/Docs [retrieved on May 12, 2018].
Rossetto F., et al., "Design and Analysis of Random Access Networks with Interference Alignment", 45th Annual Conference on Information Sciences and Systems (CISS), 2011, IEEE, Mar. 23, 2011 (Mar. 23, 2011), pp. 1-6, XP031866434, DOI: 10.11 09/CISS.2011.5766171, ISBN: 978-1-4244-9846-8.

* cited by examiner

SPATIAL LISTEN BEFORE TALK BY PRECODED REQUEST TO SEND AND CLEAR TO SEND VIA WHITENING

CROSS REFERENCES

The present Application for Patent claims priority to U.S. Provisional Patent Application No. 62/531,780 by FAN, et al., entitled "SPATIAL LISTEN BEFORE TALK BY PRECODED REQUEST TO SEND AND CLEAR TO SEND VIA WHITENING," filed Jul. 12, 2017, assigned to the assignee hereof.

BACKGROUND

The following relates generally to wireless communication, and more specifically to spatial listen before talk by precoded request to send and clear to send via whitening.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, a medium reservation protocol may be used to allow a wireless device to reserve the wireless channel such that the wireless device can transmit without interference from another device. One such medium reservation protocol may include the exchange of request to send (RTS) signals and clear to send (CTS) signals. The wireless device that has data ready to transmit may first transmit a RTS signal to the intended recipient. The RTS signal may include a duration field that indicates the length of time for which the wireless device wants to reserve the medium. All devices that hear the RTS signal may then refrain from transmitting for that length of time by setting their network allocation vectors (NAVs). The intended recipient may respond with a CTS signal that includes a duration field. Any devices that hear the CTS signal but did not hear the RTS signal may also set their NAVs and thereby refrain from interfering with reception at the intended recipient. The transmitting device may transmit data to the intended recipient upon receiving the CTS signal.

SUMMARY

The described techniques relate to improved methods, systems, devices, or apparatuses that support spatial listen before talk by precoded request to send and clear to send via whitening.

A method of wireless communication is described. The method may include receiving, from a first wireless communication device, a clear to send signal, the clear to send signal indicating a receiver spatial filter of the first wireless communication device, determining, by a second wireless communication device, a transmit precoder based at least in part on the receiver spatial filter of the first wireless communication device, precoding a request to send signal based at least in part on the transmit precoder, and transmitting the precoded request to send signal on a shared radio frequency spectrum band.

An apparatus for wireless communication is described. The apparatus may include means for receiving, from a first wireless communication device, a clear to send signal, the clear to send signal indicating a receiver spatial filter of the first wireless communication device, means for determining, by a second wireless communication device, a transmit precoder based at least in part on the receiver spatial filter of the first wireless communication device, means for precoding a request to send signal based at least in part on the transmit precoder, and means for transmitting the precoded request to send signal on a shared radio frequency spectrum band.

Another apparatus for wireless communication is described. The apparatus may include a processor, memory in electronic communication with the processor, and instructions stored in the memory. The instructions may be operable to cause the processor to receive, from a first wireless communication device, a clear to send signal, the clear to send signal indicating a receiver spatial filter of the first wireless communication device, determine, by a second wireless communication device, a transmit precoder based at least in part on the receiver spatial filter of the first wireless communication device, precode a request to send signal based at least in part on the transmit precoder, and transmit the precoded request to send signal on a shared radio frequency spectrum band.

A non-transitory computer readable medium for wireless communication is described. The non-transitory computer-readable medium may include instructions operable to cause a processor to receive, from a first wireless communication device, a clear to send signal, the clear to send signal indicating a receiver spatial filter of the first wireless communication device, determine, by a second wireless communication device, a transmit precoder based at least in part on the receiver spatial filter of the first wireless communication device, precode a request to send signal based at least in part on the transmit precoder, and transmit the precoded request to send signal on a shared radio frequency spectrum band.

In some examples of the method, apparatus, and non-transitory computer-readable medium described above, determining the transmit precoder comprises: identifying one or more transmit precoder candidates. In some examples of the method, apparatus, and non-transitory computer-readable medium described above, the method further comprising selecting one of the one or more transmit precoder candidates based at least in part on a detection threshold.

In some examples of the method, apparatus, and non-transitory computer-readable medium described above, selecting one of the one or more transmit precoder candidates comprises: calculating a transpose of each of the one or more transmit precoder candidates. In some examples of the method, apparatus, and non-transitory computer-readable medium described above, the method further comprising determining a covariance value for each of the one or more transmit precoder candidates based at least in part on the transpose of each of the one or more precoder candidates and the clear to send signal. Some examples of the method, apparatus, and non-transitory computer-readable medium described above may further include processes, features, means, or instructions for selecting the one of the one or more transmit precoder candidates based at least in part on the covariance value.

Some examples of the method, apparatus, and non-transitory computer-readable medium described above may further include processes, features, means, or instructions for receiving, from a third wireless communication device, a second clear to send signal, the second clear to send signal precoded based at least in part on a filter derived based at least in part on the transmit precoder.

Some examples of the method, apparatus, and non-transitory computer-readable medium described above may further include processes, features, means, or instructions for transmitting, to the third wireless communication device, a data signal.

Some examples of the method, apparatus, and non-transitory computer-readable medium described above may further include processes, features, means, or instructions for determining a dimension of the clear to send signal. Some examples of the method, apparatus, and non-transitory computer-readable medium described above may further include processes, features, means, or instructions for identifying a remaining dimension for data communications based on the dimension of the clear to send signal. Some examples of the method, apparatus, and non-transitory computer-readable medium described above may further include processes, features, means, or instructions for transmitting a data signal to the third wireless communication device, the data signal having the remaining dimension.

Some examples of the method, apparatus, and non-transitory computer-readable medium described above may further include processes, features, means, or instructions for determining an initial remaining dimension based at least in part on the dimension of the clear to send signal and an available dimension for communications between the second wireless communication device and a third wireless communication device. Some examples of the method, apparatus, and non-transitory computer-readable medium described above may further include processes, features, means, or instructions for transmitting the precoded request to send signal, the precoded request to send signal having the initial remaining dimension. Some examples of the method, apparatus, and non-transitory computer-readable medium described above may further include processes, features, means, or instructions for receiving, from the third wireless communication device, a second clear to send signal. Some examples of the method, apparatus, and non-transitory computer-readable medium described above may further include processes, features, means, or instructions for determining the remaining dimension based at least in part on the initial remaining dimension and a dimension of the second clear to send signal.

Some examples of the method, apparatus, and non-transitory computer-readable medium described above may further include processes, features, means, or instructions for determining an initial remaining dimension based at least in part on the dimension of the clear to send signal and an available dimension for communications between the second wireless communication device and a third wireless communication device. Some examples of the method, apparatus, and non-transitory computer-readable medium described above may further include processes, features, means, or instructions for transmitting the precoded request to send signal, the precoded request to send signal having the initial remaining dimension. Some examples of the method, apparatus, and non-transitory computer-readable medium described above may further include processes, features, means, or instructions for receiving, from the third wireless communication device, a second clear to send signal. Some examples of the method, apparatus, and non-transitory computer-readable medium described above may further include processes, features, means, or instructions for determining the remaining dimension based at least in part on a dimension of the second clear to send signal.

In some examples of the method, apparatus, and non-transitory computer-readable medium described above, the transmit precoder comprises a whitening filter.

Some examples of the method, apparatus, and non-transitory computer-readable medium described above may further include processes, features, means, or instructions for determining the transmit precoder may be based at least in part on the whitening filter.

Some examples of the method, apparatus, and non-transitory computer-readable medium described above may further include processes, features, means, or instructions for constructing the whitening filter based at least in part on a data signal received from the first wireless device.

Some examples of the method, apparatus, and non-transitory computer-readable medium described above may further include processes, features, means, or instructions for constructing the whitening filter based at least in part on one of the clear to send signal or a network allocation vector associated with the clear to send signal.

Some examples of the method, apparatus, and non-transitory computer-readable medium described above may further include processes, features, means, or instructions for constructing the whitening filter based at least in part on the clear to send signal and a preceding request to send signal to which the clear to send signal may be responsive.

A method of wireless communication is described. The method may include receiving, at a wireless communication device, a signal indicating request to send precoded with a transmitter precoder, determining a receiver precoder based at least in part on the signal indicating request to send precoded with the transmitter precoder, and transmitting a signal indicating clear to send precoded with the receiver precoder.

An apparatus for wireless communication is described. The apparatus may include means for receiving, at a wireless communication device, a signal indicating request to send precoded with a transmitter precoder, means for determining a receiver precoder based at least in part on the signal indicating request to send precoded with the transmitter precoder, and means for transmitting a signal indicating clear to send precoded with the receiver precoder.

Another apparatus for wireless communication is described. The apparatus may include a processor, memory in electronic communication with the processor, and instructions stored in the memory. The instructions may be operable to cause the processor to receive, at a wireless communication device, a signal indicating request to send precoded with a transmitter precoder, determine a receiver precoder based at least in part on the signal indicating request to send precoded with the transmitter precoder, and transmit a signal indicating clear to send precoded with the receiver precoder.

A non-transitory computer readable medium for wireless communication is described. The non-transitory computer-readable medium may include instructions operable to cause a processor to receive, at a wireless communication device, a signal indicating request to send precoded with a transmitter precoder, determine a receiver precoder based at least in part on the signal indicating request to send precoded with the transmitter precoder, and transmit a signal indicating clear to send precoded with the receiver precoder.

Some examples of the method, apparatus, and non-transitory computer-readable medium described above may further include processes, features, means, or instructions for determining a receive filter based at least in part on the signal indicating request to send precoded with the transmitter precoder. Some examples of the method, apparatus, and non-transitory computer-readable medium described above may further include processes, features, means, or instructions for determining the receiver precoder based at least in part on the receive filter.

In some examples of the method, apparatus, and non-transitory computer-readable medium described above, the receiver precoder comprises a transpose of the receive filter.

A method of wireless communication is described. The method may include performing a transpose operation on a receiver spatial filter of a wireless communication device to obtain a transpose of the receiver spatial filter, precoding, by the wireless communication device, a clear to send signal based at least in part on the transpose of the receiver spatial filter of the wireless communication device, and transmitting the precoded clear to send signal over a shared radio frequency spectrum band.

An apparatus for wireless communication is described. The apparatus may include means for performing a transpose operation on a receiver spatial filter of a wireless communication device to obtain a transpose of the receiver spatial filter, means for precoding, by the wireless communication device, a clear to send signal based at least in part on the transpose of the receiver spatial filter of the wireless communication device, and means for transmitting the precoded clear to send signal over a shared radio frequency spectrum band.

Another apparatus for wireless communication is described. The apparatus may include a processor, memory in electronic communication with the processor, and instructions stored in the memory. The instructions may be operable to cause the processor to perform a transpose operation on a receiver spatial filter of a wireless communication device to obtain a transpose of the receiver spatial filter, precode, by the wireless communication device, a clear to send signal based at least in part on the transpose of the receiver spatial filter of the wireless communication device, and transmit the precoded clear to send signal over a shared radio frequency spectrum band.

A non-transitory computer readable medium for wireless communication is described. The non-transitory computer-readable medium may include instructions operable to cause a processor to perform a transpose operation on a receiver spatial filter of a wireless communication device to obtain a transpose of the receiver spatial filter, precode, by the wireless communication device, a clear to send signal based at least in part on the transpose of the receiver spatial filter of the wireless communication device, and transmit the precoded clear to send signal over a shared radio frequency spectrum band.

Some examples of the method, apparatus, and non-transitory computer-readable medium described above may further include processes, features, means, or instructions for receiving a request to send signal. Some examples of the method, apparatus, and non-transitory computer-readable medium described above may further include processes, features, means, or instructions for transmitting the precoded signal indicating clear to send in response to the signal indicating clear to send.

DETAILED DESCRIPTION

In some examples, a wireless device such as a user equipment (UE) may want to transmit without interfering with an ongoing transmission being received by another device. For example, a first wireless device may receive a first request to send signal and, in response, transmit a clear to send. A second wireless device within the range of the first wireless device may receive the clear to send and recognize that the first wireless device is receiving a transmission. However, the second wireless device may be able to transmit if it can minimize interference at the first wireless device. The second device may communicate with the first device over a channel G, and the first wireless device may apply a receive filter P to all incoming communications. In such a case, the second device may transmit without significantly interfering with the ongoing transmission at the first wireless device by applying a transmit precoder W to all outgoing transmissions such that PGW=0.

However, the second wireless device may not have knowledge of the cross-link channel G or the receive filter P. In order to allow the second wireless device to calculate an appropriate transmit precoder W, the first wireless device may precode the clear to send signal based at least in part on the receive filter P. For example, the wireless device may precode the clear to send signal based at least in part on the transpose receive filter $P^T$. The second wireless device may determine a transmit precoder based at least in part on the clear to send signal. The second wireless device may use the transmit precoder to communicate with a third wireless device without significantly interfering with ongoing communication at the first wireless device.

Figure 1:
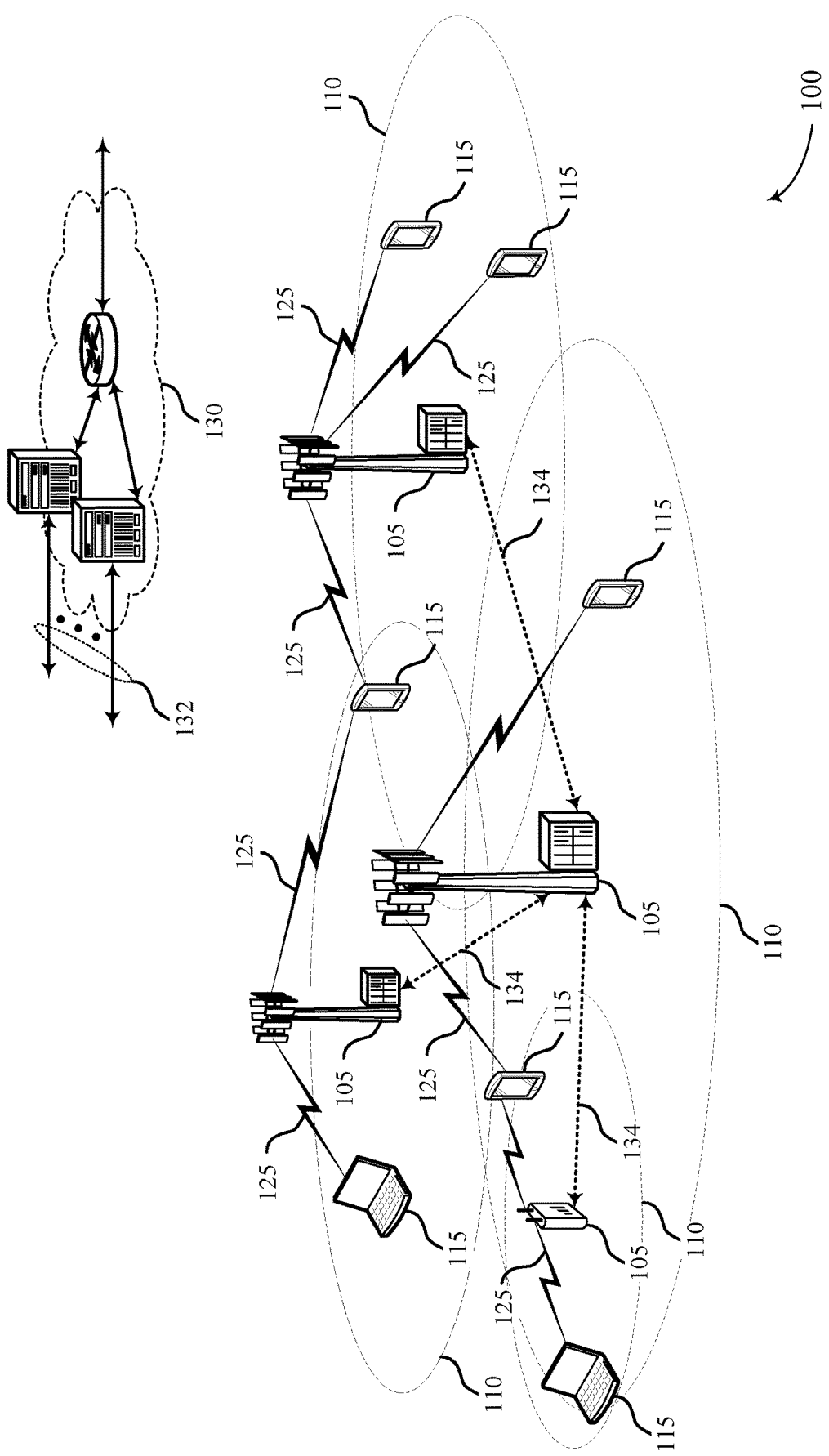
FIG. 1 illustrates an example of a system for wireless communication that supports spatial listen before talk by precoded request to send and clear to send via whitening in accordance with aspects of the present disclosure.

Aspects of the disclosure are initially described in the context of a wireless communications system. Aspects of the disclosure are further illustrated by and described with reference to apparatus diagrams, system diagrams, and flowcharts that relate to spatial listen before talk by precoded request to send and clear to send via whitening FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134

(e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as a base station 105 or a core network device, may include subcomponents such as an access network entity, which may be an example of an access node controller (ANC). Each access network entity may communicate with a number of UEs 115 through a number of other access network transmission entities, such as base stations, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may contain one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
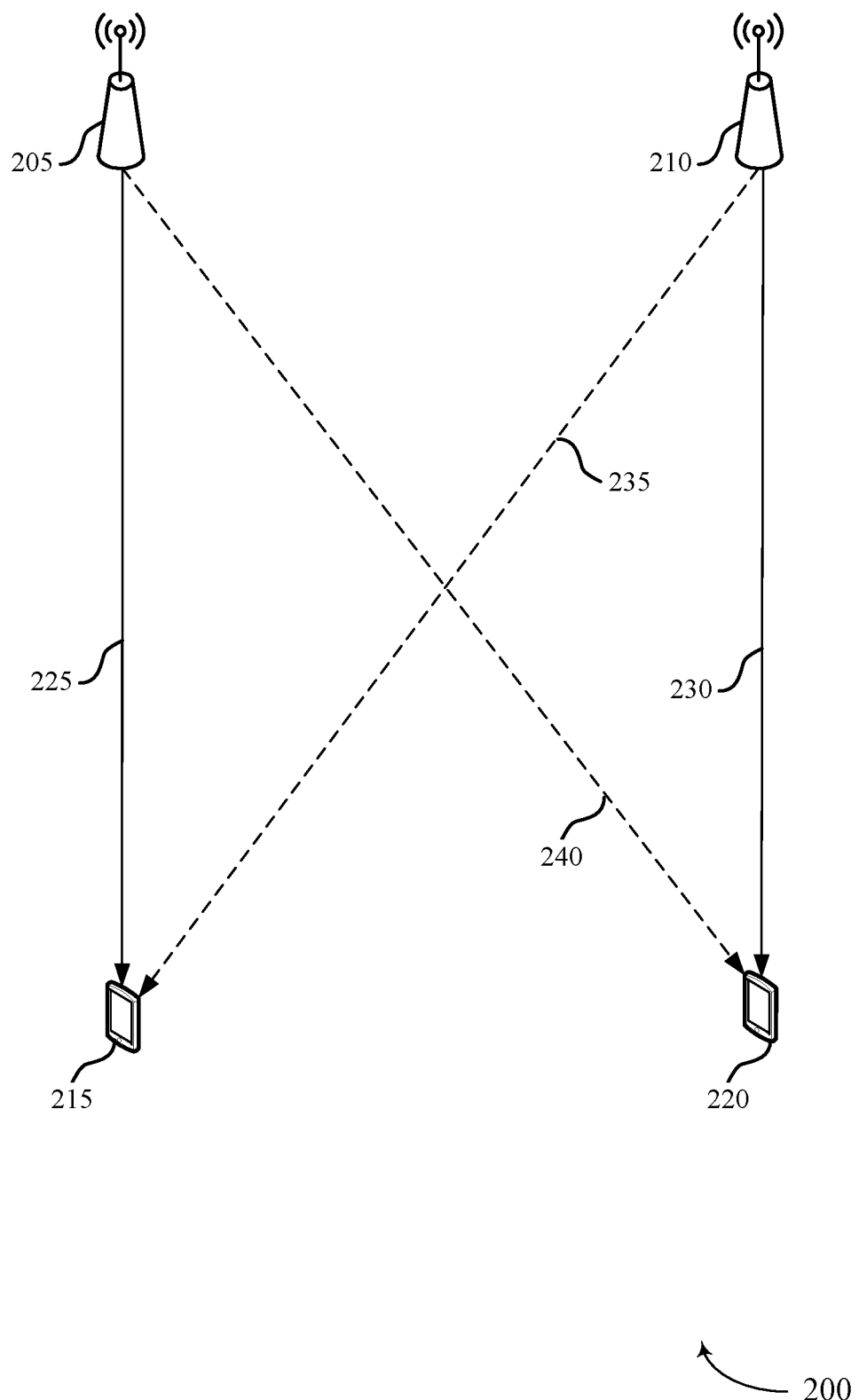
FIG. 2 illustrates an example of a wireless communications network that supports spatial listen before talk by precoded request to send and clear to send via whitening in accordance with aspects of the present disclosure.

FIG. 2 illustrates an example of a wireless communications system 200 that supports spatial listen before talk by precoded request to send and clear to send via whitening in accordance with various aspects of the present disclosure. In some examples, wireless communications system 200 may implement aspects of wireless communications system 100.

The wireless communications system 200 may include a first base station 205 and a second base station 210, which may be examples of aspects of base station 105 as described with reference to FIG. 1. The wireless communications system 200 may further include a first UE 215 and a second UE 220, which may be examples of aspects of UE 115 as described with reference to FIG. 1. The first base station 205 and the first UE 215 may be members of a first basic service set, and the second base station 210 and the second UE 220 may be members of a second basic service set.

The first base station 205 may communicate with the first UE 215 along a first channel $H_1$ 225. The second base station 210 may communicate with the second UE 220 along a second channel $H_2$ 230. The first UE 215 may receive interference from the second base station 210 along a first interference channel $G_1$ 235. The second UE 220 may receive interference from the first base station 205 along a second interference channel $G_2$ 240.

The first UE 215 may use a receive filter P for incoming transmissions. The second base station 210 may use a transmit precoder W for outgoing transmissions. The interference along the first interference channel $G_1$ 235 may be defined as PGW. In some examples, the second base station 210 may have information to transmit (e.g., to the second UE 220) while the first UE 215 is receiving information from another device (e.g., the first base station 205). In order to avoid interfering with the transmission at the first UE 215, the second base station 210 may design a transmit precoder W such that PGW is equal to zero or below a threshold.

In some examples, the first base station 205 may have information ready to transmit to the first UE 215. The first base station 205 may use a listen before talk (LBT) procedure to reserve the medium. The first base station 205 may transmit a request to send (RTS) signal to the first UE 215.

The first UE 215 may transmit a clear to send (CTS) signal to the first base station 205. The first UE 215 may indicate the receive filter P in the CTS signal. For example, the first UE 215 may precode the CTS signal based at least in part on the receive filter P. In some examples, the first UE 215 may precode the CTS signal by the transpose of the receive filter $P^T$. The CTS signal may be received at the second base station 210 as $G^T P^T x$.

The second base station 210 may determine a transmit precoder W based at least in part on the received CTS signal. In some examples, the transmit precoder W may include a whitening filter and a secondary filter. The second base station 210 may select the transmit precoder W from one or more candidate transmit precoder based at least in part on a spatial LBT test. For example, the second base station 210 may select the a transmit precoder W if the covariance of the received signal precoded by the transpose of the transmit precoder is less than a threshold.

The second base station 210 may transmit a second request to send (RTS) signal to the second UE 220. The second base station 210 may indicate the transmit precoder W in the second RTS signal. For example, the second RTS signal may be precoded by the transmit precoder W.

The second UE 220 may derive a spatial filter based at least in part on the second RTS signal. For example, the second UE 220 may derive the spatial filter based at least in part on the received signal and the whitened channel at the second UE 220. The second UE 220 may respond by transmitting a second CTS signal. The second UE 220 may indicate the spatial filter. For example, the second UE 220 may be precoded by the transpose of the spatial filter.

The second base station 210 may transmit data to the second UE 220 while the first UE 215 is receiving data from the first base station 205 by precoding the data with the transmit precoder W.

Figure 3:
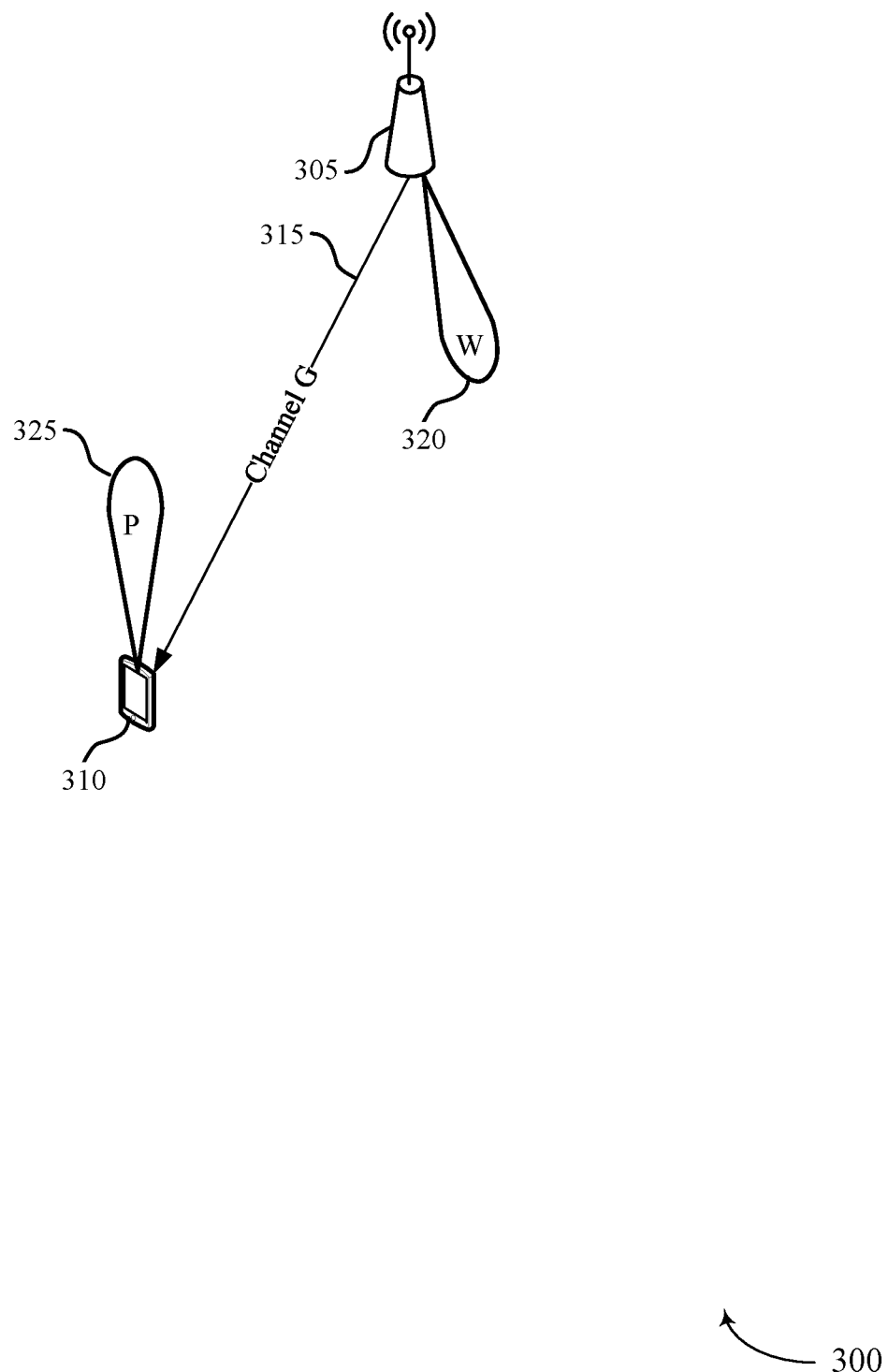
FIG. 3 illustrates an example of a wireless communications network that supports spatial listen before talk by precoded request to send and clear to send via whitening in accordance with aspects of the present disclosure.

FIG. 3 illustrates an example of a wireless communications network 300 that supports spatial listen before talk by precoded request to send and clear to send via whitening in accordance with various aspects of the present disclosure. In some examples, wireless communications network 300 may implement aspects of wireless communications system 100.

The wireless communications network 300 includes an base station 305 and a UE 310. The base station 305 and the UE 310 may be examples of aspects of base station 105 and UE 115 as described with reference to FIG. 1. The base station 305 and UE 310 may communicate over a channel G 315.

In some examples, the base station 305 may transmit using a transmit precoder W 320. The precoded transmission may travel along the channel G 315. The UE 310 may apply a receive filter P 325 to the transmission. Thus, the UE 310 receives a signal PGW from the base station 305. In order to avoid interference with other transmissions being received by the UE 310, the base station 305 may create a null when the transmission is passed through the receive filter P 325. The base station 305 may select a transmit precoder W such that PGW is close to or equal to zero. However, the base station 305 may not have knowledge of the receive filter P 325 or the channel G 315.

The base station 305 may select a transmit precoder W 320 based at least in part on information received from the UE 310. For example, the base station 305 may select a transmit precoder W 320 based at least in part on one or more transmissions (e.g., a clear to send signal) from the UE 310 as part of a listen before talk (LBT) procedure.

In some examples, the UE 310 may receive a request to send signal from another wireless device (e.g., a second base station). The request to send (RTS) signal may indicate that the second base station intends to transmit data to the UE 310. In response to the RTS signal, the UE 310 may transmit a clear to send (CTS) signal. The UE 310 may precode the CTS signal based at least in part on the receive filter P 325. For example, the UE 310 may precode the CTS signal based at least in part on a transpose of the receive filter P 325. The CTS signal received at the base station 305 may be described as:

$$y = G^T P^T x + n \quad (1)$$

where y is the signal received at the base station 305, x is the CTS signal, $P^T$ is the transpose of the receive filter P 325, $G^T$ is the transpose of the channel G 315, and n is noise. In some examples, the signal y may be synthesized from received CTS signals and their associated network allocation vectors (NAVs).

The base station 305 may test whether a candidate transmit precoder is feasible by testing whether $W^T(G^T P^T x)$ is less than a threshold.

The base station 305 may use the received signal y to select an appropriate value for the transmit precoder W 320. The base station 305 may select a value for the transmit precoder W 320 based at least in part on a threshold. For example, the covariance of the received signal y may be defined as:

$$N_t = G^T P^T P G + \sigma^2 \quad (2)$$

where $N_t$ is the covariance of the received signal y and $\sigma$ is noise and interference variance. The base station 305 may select a value for the transmit precoder W 320 based at least in part on the covariance of a signal $W^T y$. For example, the value of the transmit precoder W 320 may be selected such that the following constraint is met:

$$W^T N_t W < \epsilon I \quad (3)$$

where $W^T$ is the transpose of the transmit precoder W 320, $\epsilon$ is a threshold, and I is the identity matrix.

The transmit precoder W 320 may be defined based at least in part on a whitening filter. For example, the transmit precoder W 320 may be defined as:

$$W = N_t^{-1/2} \tilde{W} \quad (4)$$

where $N_t^{-1/2}$ is a whitening filter. The LBT test described in Eqn. (3) may be rewritten as:

$$\tilde{W}^T \tilde{W} < \epsilon I \quad (5)$$

where $\tilde{W}^T$ is the transpose of $\tilde{W}$. In some examples, the LBT test may be considered equivalent to staying within a power constraint on a whitening channel.

In some examples, the receive filter P 325 may be defined based at least in part on a whitening filter similar to the definition of the transmit precoder W 320 in Eqn. (4). Accordingly, the effective channel $G_{eff}$ between the base station 305 and the UE 310 may be defined as:

$$G_{eff} = PGW = \tilde{P} N_{t,Rx}^{-1/2} G N_{t,Tx}^{-1/2} \tilde{W} \quad (6)$$

where $N_{t,Rx}^{-1/2}$ is the whitening filter at the UE 310 and $N_{t,Tx}^{-1/2}$ is the whitening filter at the base station 305.

Figure 4:
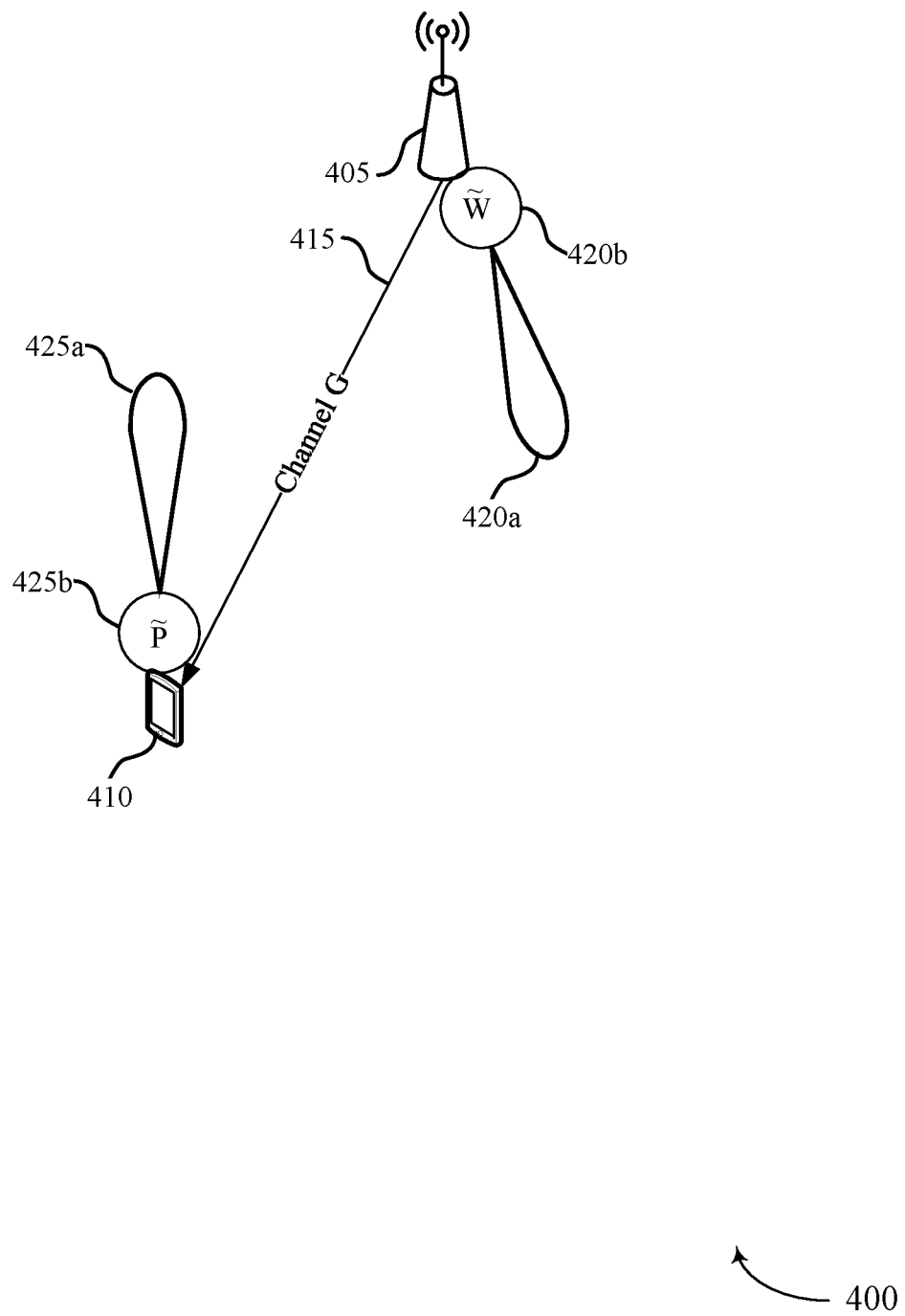
FIG. 4 illustrates an example of a wireless communications network that supports spatial listen before talk by precoded request to send and clear to send via whitening in accordance with aspects of the present disclosure.

FIG. 4 illustrates an example of a wireless communications network 400 that supports spatial listen before talk by precoded request to send and clear to send via whitening in accordance with various aspects of the present disclosure. In some examples, wireless communications network 400 may implement aspects of wireless communications system 100.

The wireless communications network 400 includes a base station 405 and a UE 410. The base station 405 and the UE 410 may be examples of aspects of base station 105 and UE 115 as described with reference to FIG. 1. The base station 405 and UE 410 may communicate over a channel G 415. The base station 405 may utilize a transmit precoder W 420 including a whitening filter 420a and a secondary filter $\tilde{W}$ 420b, as described with reference to FIG. 3. The UE 410 may utilize a receive filter P 425 including a whitening filter 425a and a secondary filter $\tilde{P}$ 425b, as described with reference to FIG. 3.

Figure 5:
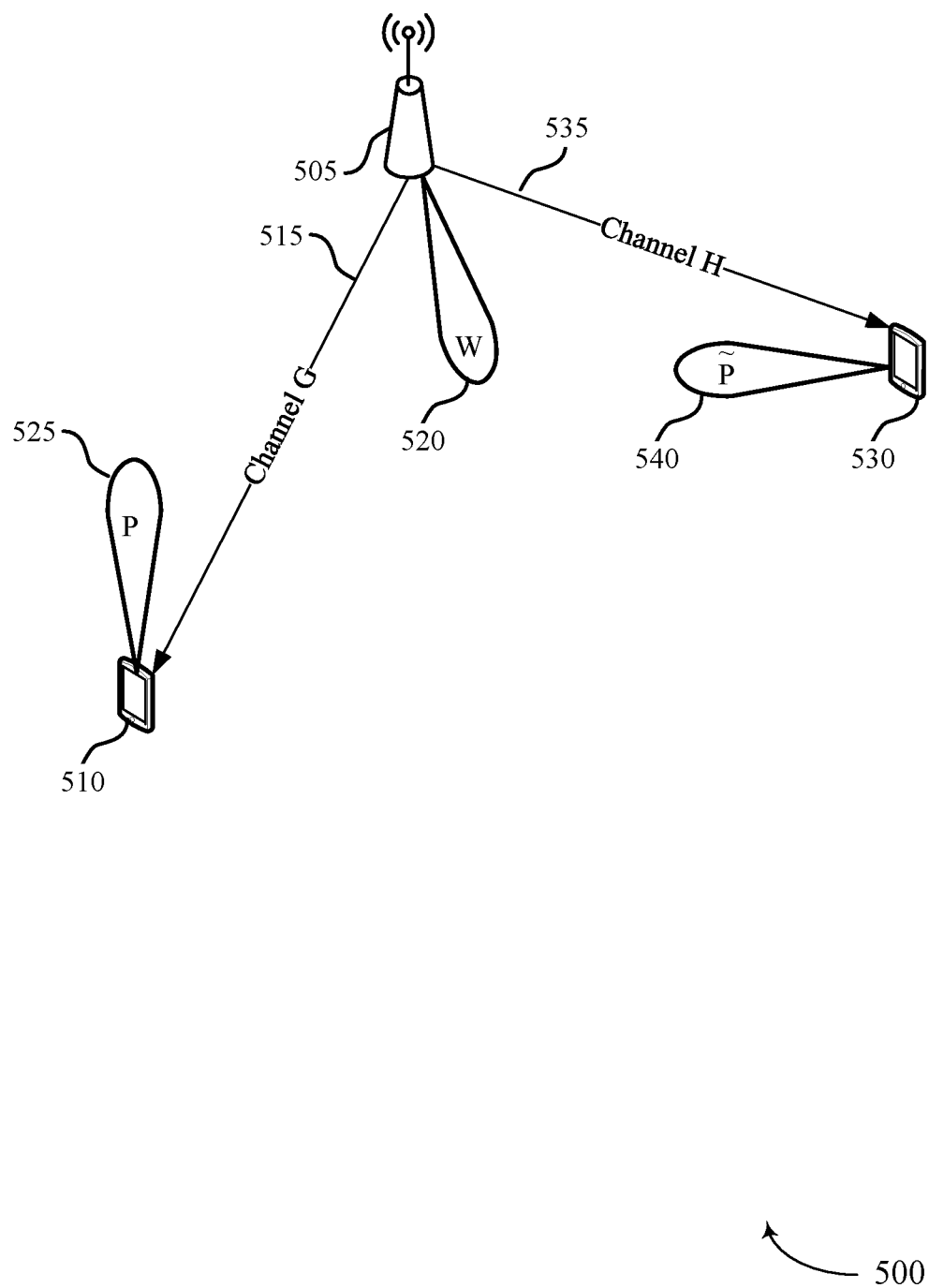
FIG. 5 illustrates an example of a wireless communications network that supports spatial listen before talk by precoded request to send and clear to send via whitening in accordance with aspects of the present disclosure.

FIG. 5 illustrates an example of a wireless communications network 500 that supports spatial listen before talk by precoded request to send and clear to send via whitening in accordance with various aspects of the present disclosure. In some examples, wireless communications network 500 may implement aspects of wireless communications system 100.

The wireless communications network 500 includes a base station 505 and a first UE 510. The base station 505 and the first UE 510 may be examples of aspects of base station 105 and UE 115 as described with reference to FIG. 1. The base station 505 and first UE 510 may communicate over a channel G 515. The base station 505 may utilize a transmit precoder W 520 including a whitening filter 520a and a secondary filter $\tilde{W}$ 520b, as described with reference to FIGS. 3 and 4. The first UE 510 may utilize a receive filter P 525 including a whitening filter 525a and a secondary filter $\tilde{P}$ 525b, as described with reference to FIGS. 3 and 4.

The wireless communications network 500 may also include a second UE 530, which may be an example of aspects of UE 115 as described with reference to FIG. 1. The base station 505 may communicate with the second UE 530 over a channel H 535. The second UE 530 may utilize a second receive filter $\overline{P}_2$ 540.

In some examples, the base station 505 may receive a CTS signal from the first UE 510 and select a transmit precoder W 520, as described with reference to FIG. 3. A handshaking procedure may be used to select a combination of $\tilde{W}$ 520b and the receive filter $\overline{P}_2$ 540 based on the doubly whitened channel between the base station 505 and the second UE 530, and the power constraint $\tilde{W}^T\tilde{W} \in I$. The doubly whitened channel may be described as $$\overline{P}_2 N_{t,Rx2}^{-1/2} H N_{t,Tx}^{-1/2} \quad (7)$$

where $N_{t,Rx2}^{-1/2}$ is the whitening filter at the second UE 530.

The base station 505 may then transmit data to the second UE 530 based at least in part on the selected value for the transmit precoder W 520. For example, the base station 505 may apply the transmit precoder W 520 to the data. The transmit precoder W 520 may include a component (e.g., secondary filter $\tilde{W}$) selected based on the handshake procedure between the base station 505 and the second UE 530.

In some examples, the downlink and uplink direction may not be aligned between the links. In such examples, the base station 505 may compute a whitening filter $N_{t,Tx}^{-1/2}$ based at least in part on the CTS signal from the first UE 510 and the RTS signal from the other base station to which the CTS signal is responsive. The second UE 530 may compute a whitening filter $N_{t,Rx}^{-1/2}$ based at least in part on the CTS signal from the first UE 510 and the RTS signal from the other base station to which the CTS signal is responsive.

Figure 6:
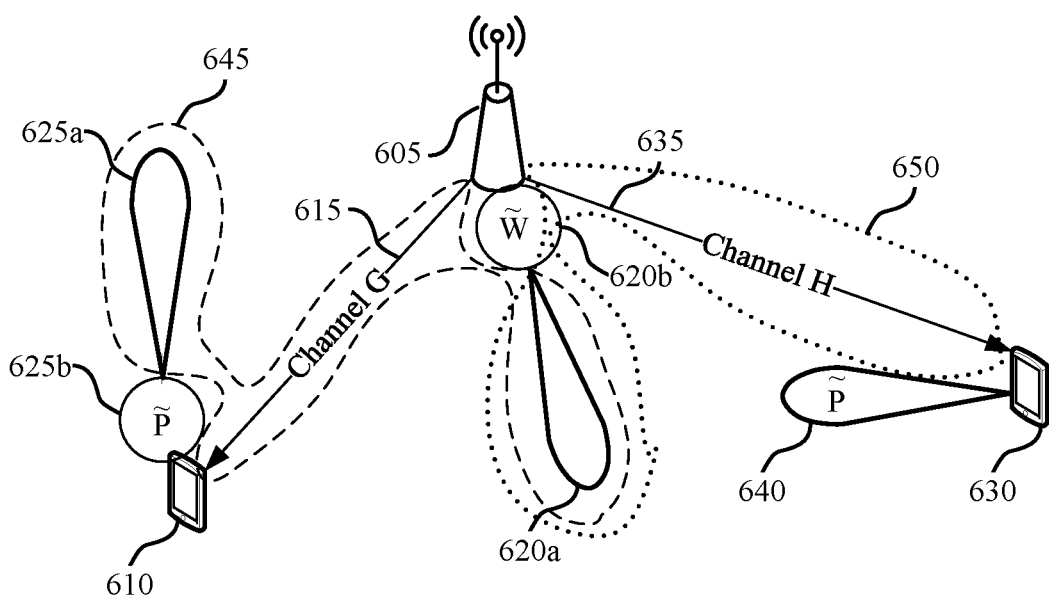
FIG. 6 illustrates an example of a wireless communications network that supports spatial listen before talk by precoded request to send and clear to send via whitening in accordance with aspects of the present disclosure.

FIG. 6 illustrates an example of a wireless communications network 600 that supports spatial listen before talk by precoded request to send and clear to send via whitening in accordance with various aspects of the present disclosure. In some examples, wireless communications network 600 may implement aspects of wireless communications system 100.

The wireless communications network 600 includes a base station 605 and a UE 610. The base station 605 and the UE 610 may be examples of aspects of base station 105 and UE 115 as described with reference to FIG. 1. The base station 605 and UE 610 may communicate over a channel G 615. The base station 605 may utilize a transmit precoder W 620 including a base station whitening filter 620a and a secondary filter $\tilde{W}$ 620b, as described with reference to FIGS. 3 and 4. The UE 610 may utilize a receive filter P 625 including a UE whitening filter 625a and a secondary filter $\tilde{P}$ 625b, as described with reference to FIGS. 3 and 4.

The wireless communications network 600 may also include a serving UE 630, which may be an example of aspects of UE 115 described with reference to FIG. 1. The base station 605 may communicate with the serving UE 630 over a channel H 635. The serving UE 630 may utilize a second receive filter $\overline{P}_2$ 640.

A first whitened channel 645 may exist between the base station 605 and the UE 610. The first whitened channel 645 may include the base station whitening filter 620a, the channel G 615, and the UE whitening filter 625a. A second whitened channel 650 may exist between the base station 605 and the serving UE 630. The second whitened channel 650 may include the base station whitening filter 620a and the channel H 635.

Figure 7:
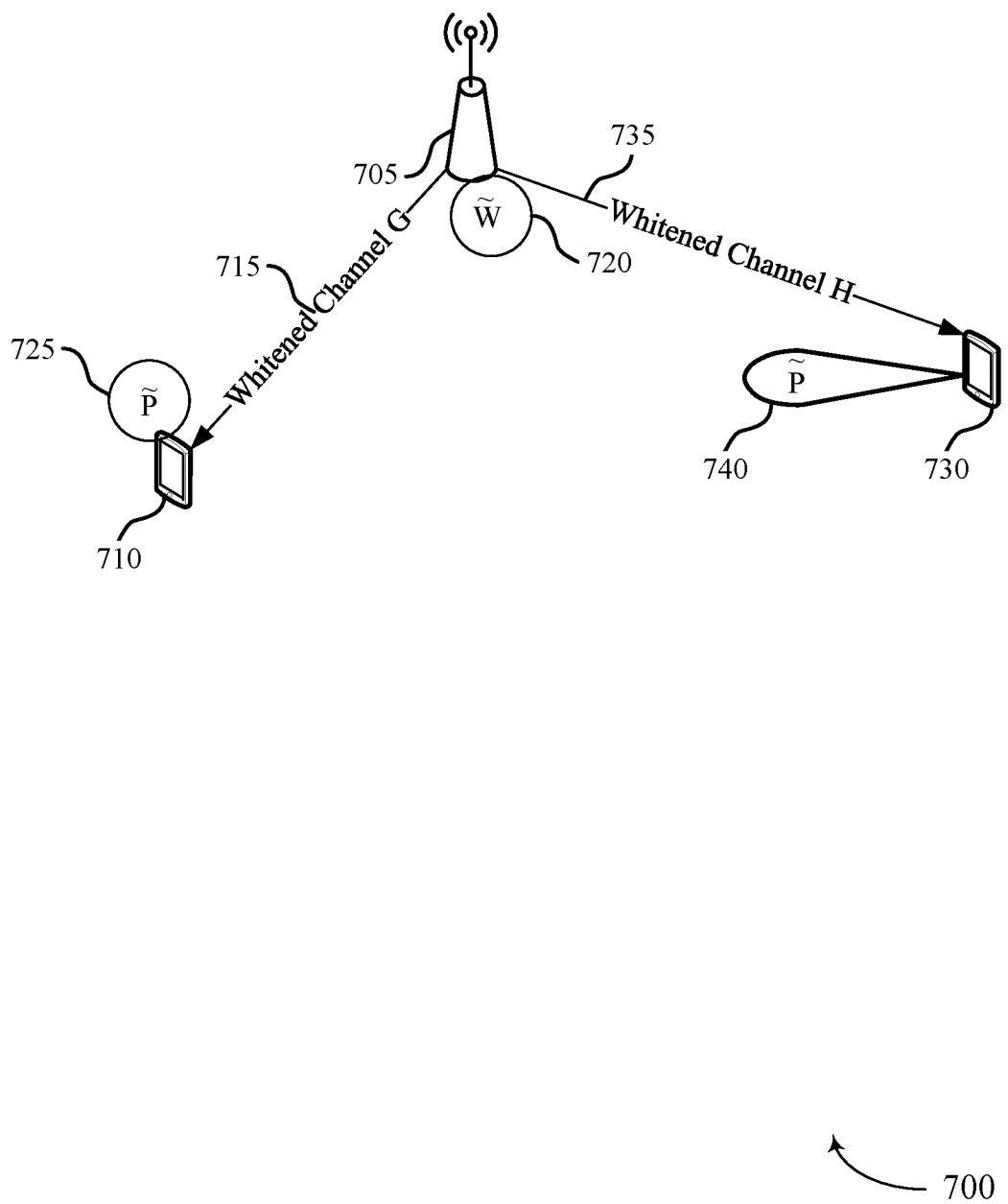
FIG. 7 illustrates an example of a wireless communications network that supports spatial listen before talk by precoded request to send and clear to send via whitening in accordance with aspects of the present disclosure.

FIG. 7 illustrates an example of a wireless communications network 700 that supports spatial listen before talk by precoded request to send and clear to send via whitening in accordance with various aspects of the present disclosure. In some examples, wireless communications network 700 may implement aspects of wireless communications system 100.

The wireless communications network 700 includes a base station 705 and a UE 710. The base station 705 and the UE 710 may be examples of aspects of base station 105 and UE 115 as described with reference to FIG. 1. The base station 705 and UE 710 may communicate over a whitened channel G 715, which may be an example of aspects of first whitened channel 645 described with reference to FIG. 6. The base station 705 may utilize a transmit precoder $\tilde{W}$ 720, as described with reference to FIGS. 3, 4, and 6. The UE 610 may utilize a receive filter $\tilde{P}$ 725, as described with reference to FIGS. 3, 4, and 6.

The wireless communications network 700 may also include a serving UE 730, which may be an example of aspects of UE 115 as described with reference to FIG. 1. The base station 705 may communicate with the serving UE 730 over a whitened channel H 735, which may be an example of aspects of the second whitened channel 650 described with reference to FIG. 6. The serving UE 730 may utilize a second receive filter $\overline{P}_2$ 740.

Figure 8:
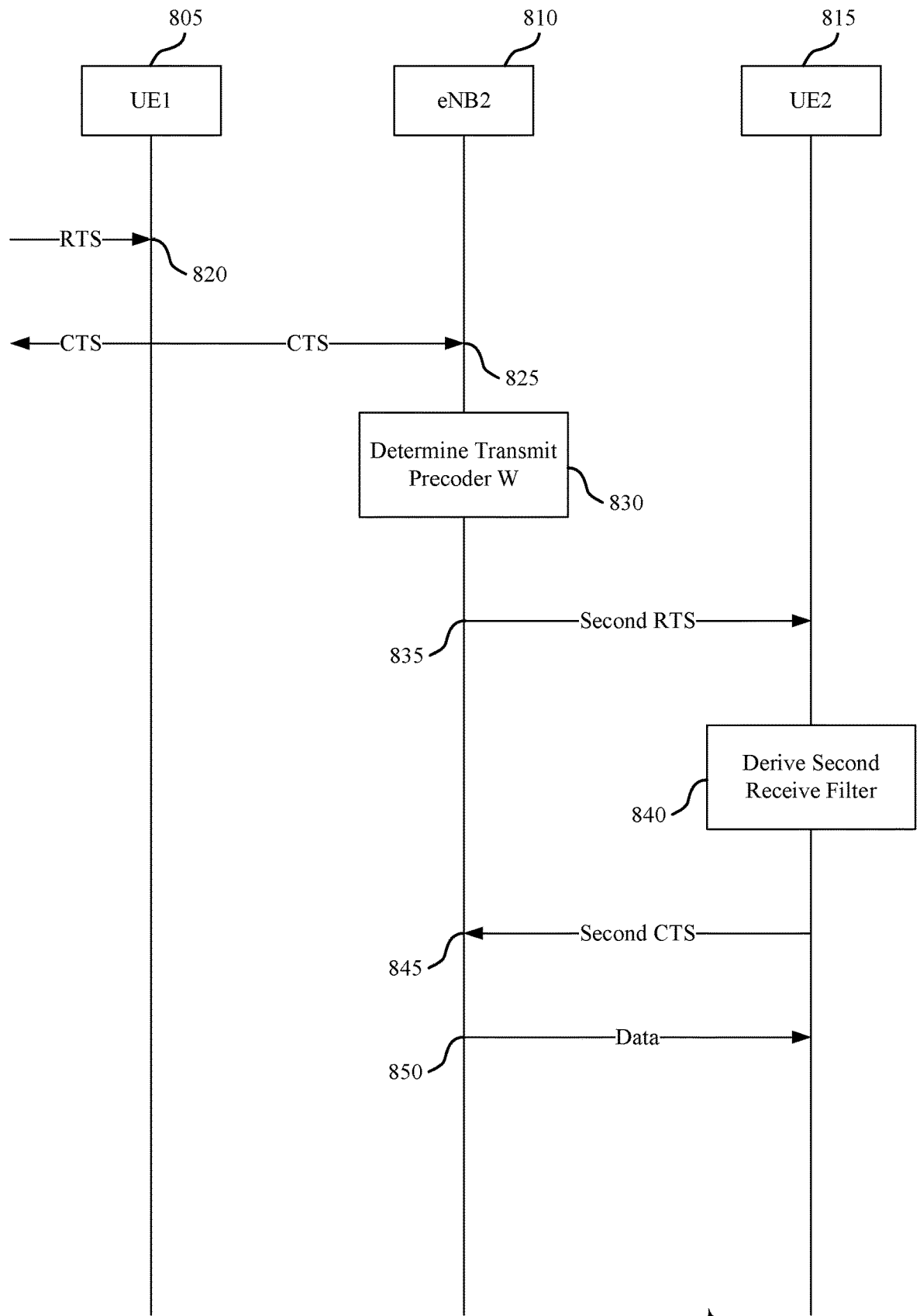
FIG. 8 illustrates an example of a flow diagram for communications in a wireless communications network that supports spatial listen before talk by precoded request to send and clear to send via whitening in accordance with aspects of the present disclosure.

FIG. 8 illustrates an example of a flow diagram 800 of communications in a wireless communications network that supports spatial listen before talk by precoded request to send and clear to send via whitening in accordance with various aspects of the present disclosure. In some examples, the wireless communications network may implement aspects of wireless communications system 100.

The flow diagram 800 shows communications involving first UE (UE1) 805, second base station (eNB2) 810, and serving UE (UE2) 815. UE1 805 and UE2 815 may be examples of aspects of UE 115 as described with reference to FIG. 1. Second base station 810 may be an example of aspects of base station 105 as described with reference to FIG. 1.

First UE UE1 805 may receive a RTS signal 820 from a first base station (not shown). The RTS signal 820 may indicate that the first base station has data to transmit to UE1 805.

UE1 805 may transmit a CTS signal 525 in response to the RTS signal 820. The CTS signal 825 may be precoded based at least in part on a receive filter P. For example, the CTS signal 825 may be precoded based at least in part on the transpose of the receive filter $P^T$. The CTS signal 825 may be addressed to the first base station, but may also be received by the second base station 810.

The second base station 810 may determine a transmit precoder W at 830 based at least in part on the CTS signal 825. In some examples, the second base station 810 may determine the transmit precoder W based at least in part on a spatial LBT test, as described with reference to FIG. 3.

The second base station 810 may transmit a second RTS signal 835 to UE2 815. The second RTS signal 835 may indicate that the second base station 810 has data to transmit to the second UE UE2 815. The second RTS signal 835 may be precoded based at least in part on the transmit precoder W.

UE2 815 may derive a second receive filter $P_2$ at 840 based at least in part on the second RTS signal 835. For example, UE2 815 may derive a second secondary receive filter $\tilde{P}_2$ based at least in part on second RTS signal 835 and a whitening filter.

UE2 815 may transmit a second CTS signal 845 in response to the second RTS signal 835. The second CTS signal 845 may be precoded based at least in part on the second receive filter $P_2$. For example, the second CTS signal 845 may be precoded with the transpose of the second receive filter $P^T$.

The second base station 810 may transmit data 850 to UE2 815 using the transmit precoder W. The rank of the data 850 may be determined based at least in part on the rank of the link between the first base station and the first UE 805, the rank of the link between the second base station 810 and the second UE 815, or a combination thereof. In some examples, the second base station 810 may determine an appropriate rank for the data based at least in part on the CTS signal 825. For example, the link between the first base station and the first UE UE1 805 may be a 1×1 link (i.e., a link with one transmission antenna and one receive antenna) with high geometry. The link between the second base station 810 and the second UE UE2 815 may be a 2×2 link. The second base station 810 may determine a strong rank-1 covariance of the CTS signal 825. Accordingly, the optimal secondary filter $\tilde{W}$ may have a rank 1 and be given by the dominant eigen-direction. The second base station 810 may therefore transmit the data 850 with rank 1.

In other examples, the link between the first base station and the first UE UE1 805 may be a 1×2 link with high geometry. The link between the second base station 810 and the second UE UE2 815 may be a 2×2 link. The CTS signal 825 may be a rank 1 transmission. UE1 805 may transmit a rank 1 precoded CTS signal 825. The second base station 810 may determine a strong rank-1 covariance of the CTS signal 825. Accordingly, the optimal secondary filter $\tilde{W}$ may have a rank 1 and be given by the dominant eigen-direction. The second base station 810 may therefore transmit the data 850 with rank 1.

In some examples (e.g., autonomous or grantless uplink examples), the first UE 805 may initiate a medium reservation procedure. In such cases, the first UE 805 may transmit the RTS signal 820. In response, the first base station may transmit a CTS signal 825. In such examples, the first base station may precode the CTS signal 825 by the transpose of the receive filter of the base station. The second base station 810 may determine the transmit precoder W based at least in part on the CTS signal 825 received from the first base station.

In some examples (e.g., autonomous or grantless uplink examples), the second UE 815 may initiate transmissions between the second base station 810 and the second UE 815. In such examples, the second UE 815 may transmit the second RTS signal 835. In response, the second base station 810 may transmit the second CTS signal 845.

Figure 9:
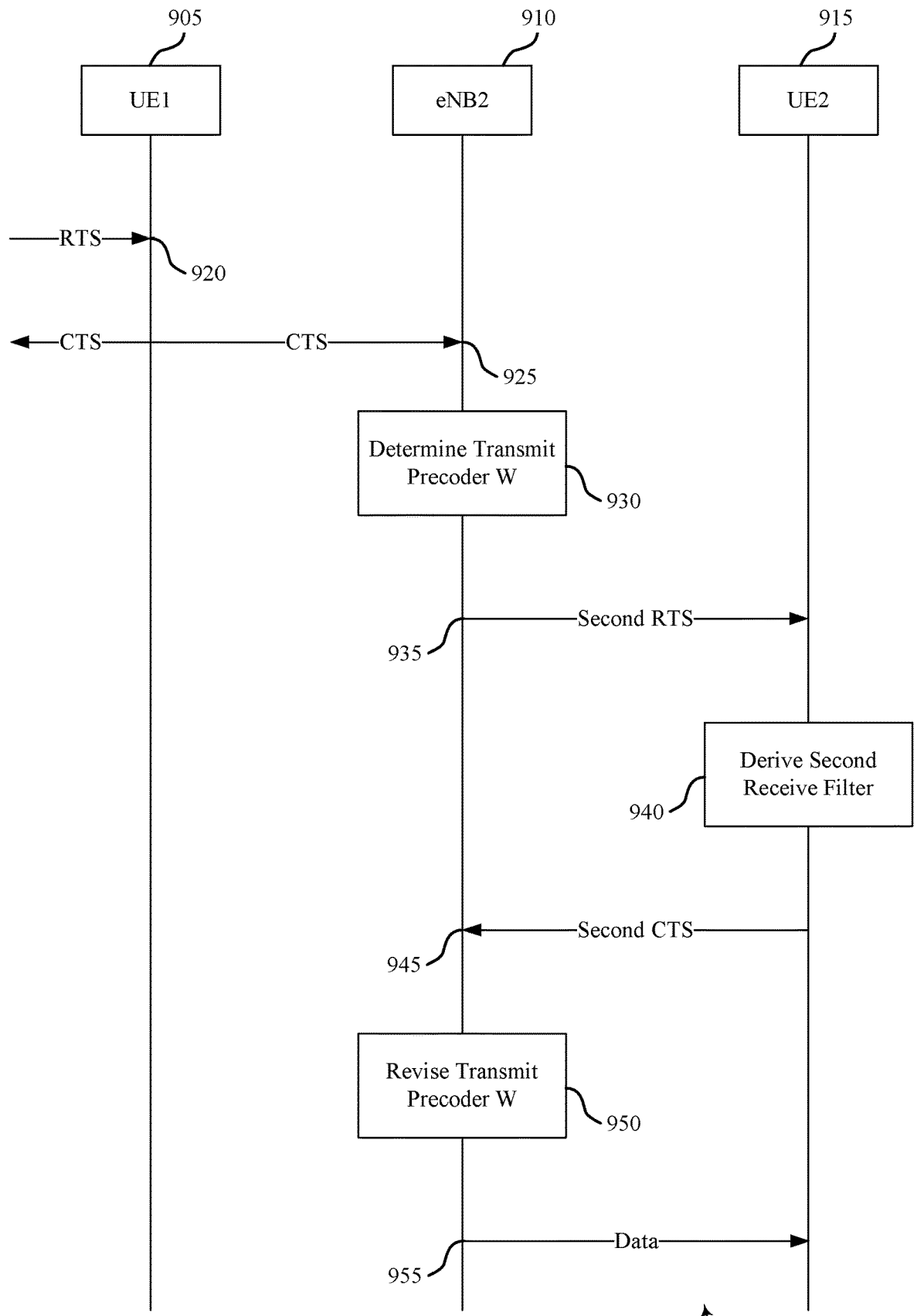
FIG. 9 illustrates an example of a flow diagram for communications in a wireless communications network that supports spatial listen before talk by precoded request to send and clear to send via whitening in accordance with aspects of the present disclosure.

FIG. 9 illustrates an example of a flow diagram 900 for communications in a wireless communications network that supports spatial listen before talk by precoded request to send and clear to send via whitening in accordance with various aspects of the present disclosure. In some examples, the wireless communications network may implement aspects of wireless communications system 100.

The flow diagram 900 shows communications involving first UE (UE1) 905, second base station (eNB2) 910, and serving UE (UE2) 915. UE1 905 and UE2 915 may be examples of aspects of UE 115 as described with reference to FIG. 1. The second base station 910 may be an example of aspects of base station 105 as described with reference to FIG. 1.

As described with reference to FIG. 5, UE1 905 may receive a RTS signal 920 from a first base station and, in response, transmit a CTS signal 925. The second base station 910 may determine a transmit precoder W at 930 based at least in part on the CTS signal 925, and transmit a second RTS signal 935 to UE2 915. UE2 915 may derive a second receive filter at 940 based at least in part on the second RTS signal 935 and transmit a second CTS signal 945 to the second base station 910.

The second base station 910 may revise the transmit precoder W at 950. The revised transmit precoder W' may be a subspace of the original transmit precoder W. The transmit precoder may be revised to a lower rank precoder, e.g., based at least in part on the second CTS signal 945.

For example, the link between the first base station and the first UE UE1 905 may be a 1×2 link. The link between the second base station 910 and the second UE UE2 915 may be a 4×4 link, but may support rank 3 due to rank deficiency. The first base station may transmit a rank 1 RTS signal 920 to UE1 905, and the first UE 905 may likewise transmit the CTS signal 925 with rank 1. The second base station 910 may derive $\tilde{W}$ based at least in part on the whitened channel between the second base station 910 and the second UE 915. Due to a strong rank 1 covariance of the CTS signal 925 and the channel H being rank 3, $\tilde{W}$ has rank 2. The second base station 910 may transmit second RTS signal 935 precoded with the transmit precoder W. The second UE 915 may receive the second RTS signal 935 with rank 2. The second UE 915 may also see strong rank 1 interference from a third base station. The second UE 915 may derive the receive filter P, which has rank 1. The second UE 915 may transmit the second CTS signal 945 precoded with the transpose of the receive filter $P^T$. From the perspective of the second base station 910, the effective channel may be described as $PHN_{t,Tx}^{-1/2}$, which has rank 1. The second base station 910 may revise the precoder based on $PHN_{t,Tx}^{-1/2}$ and transmit the rank 1 data 955 to the second UE 915.

As another example, the link between the first base station and the first UE UE1 905 may be a 1×2 link. The link between the second base station 910 and the second UE UE2 915 may be a 4×4 link, but may support rank 3 due to rank deficiency. The first base station may transmit a rank 1 RTS signal 920 to UE1 905, and the first UE 905 may likewise transmit the CTS signal 925 with rank 1. The second base station 910 may not know the channel H between the second base station 910 and UE2 915. The second base station 910 may derive $\tilde{W}$ based at least in part on the whitening filter of the second base station 910. The second base station 910 may transmit second RTS signal 935 precoded with the transmit precoder W. The second UE 915 may receive the second RTS signal 935 with rank 2. The second UE 915 may also see strong rank 1 interference from a third base station. The UE2 915 may derive a hypothetical precoder on behalf of the second base station 910, and may derive a receive filter P. The UE2 915 may transmit the second CTS signal 945 precoded by the transpose of the receive filter $P^T$. From the perspective of the second base station 910, the effective channel may be described as $PHN_{t,Tx}^{-1/2}$, which has rank 1. The second base station 910 may derive the precoder based on $PHN_{t,Tx}^{-1/2}$ and transmit the rank 1 data 955 to the second UE 915. In some examples, the derived precoder W' may be the same as the hypothetical precoder derived by the second UE 915.

As a further example, the link between the first base station and the first UE UE1 905 may be a 1×2 link. The link between the second base station 910 and the second UE UE2 915 may be a 4×4 link, but may support rank 3 due to rank deficiency. The first base station may transmit a rank 1 RTS signal 920 to UE1 905, and the first UE 905 may likewise transmit the CTS signal 925 with rank 1. The second base station 910 may not know the channel H between the second base station 910 and UE2 915. The second base station 910 may derive IN based at least in part on the whitening filter of the second base station 910. The second base station 910 may transmit second RTS signal 935 precoded with the transmit precoder W. The second UE 915 may receive the second RTS signal 935 with rank 2. The second UE 915 may also see strong rank 1 interference from a third base station. The second UE2 915 may transmit the second CTS signal 945 precoded by the transpose of the receive filter $P^T$, which is equal to $N_{t,Rx}^{-1/2}$. From the perspective of the second base station 910, the effective channel may be described as $W^T H^T P^T$. The second base station 910 may derive the precoder W based on PHW, and may transmit the rank 1 data 955 to the second UE 915.

Figure 10:
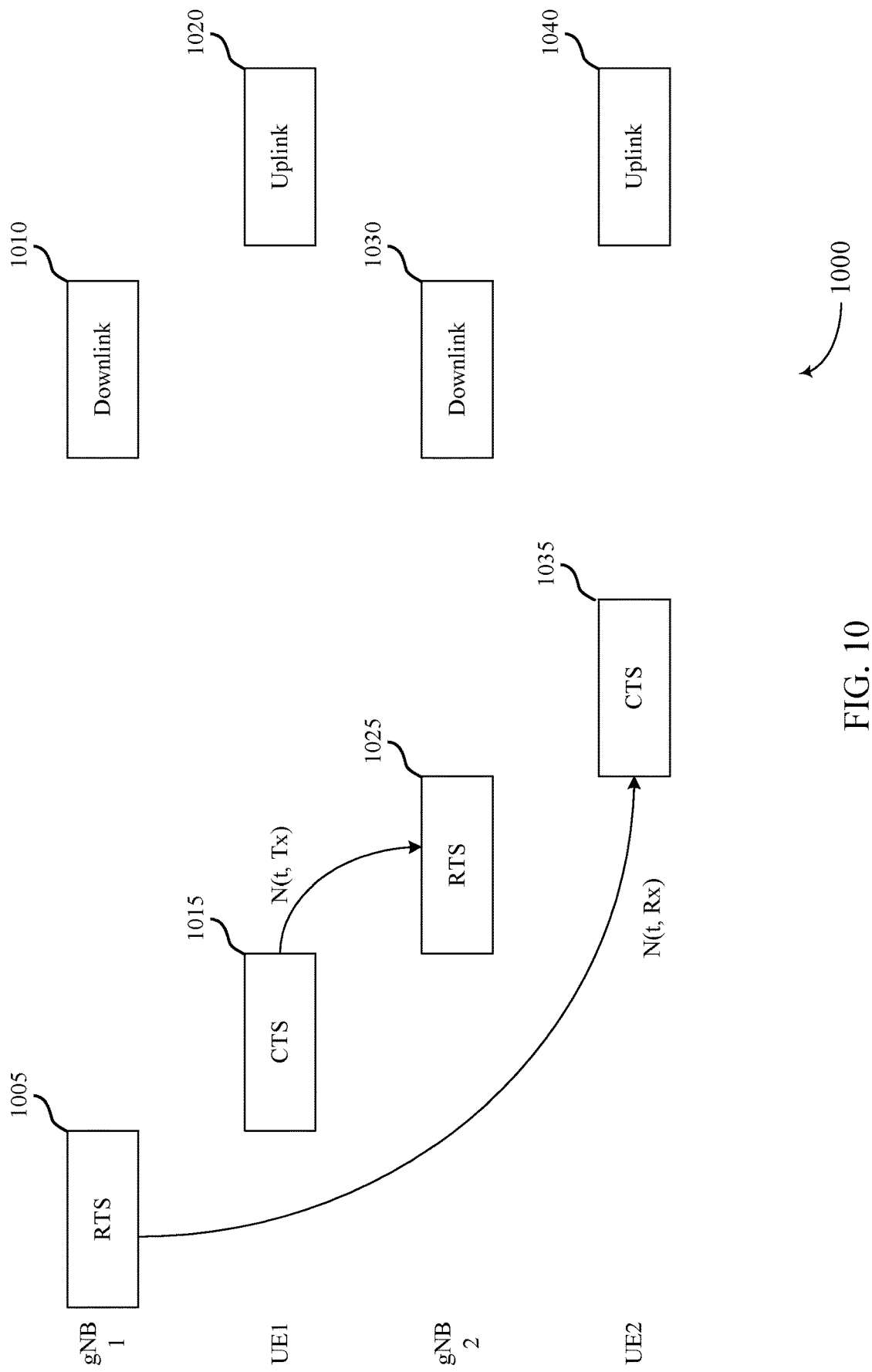
FIG. 10 illustrates an example of signal transmission in a wireless communications network that supports spatial listen before talk by precoded request to send and clear to send via whitening in accordance with aspects of the present disclosure.

FIG. 10 illustrates an example of signal transmission 1000 in a wireless communications network that supports spatial listen before talk by precoded request to send and clear to send via whitening in accordance with various aspects of the present disclosure. In some examples, the wireless communications network may implement aspects of wireless communications system 100.

The wireless communications network may include a first base station gNB1, a first UE UE1, a second base station gNB2, and a second UE UE2. The first base station gNB1 and the second base station gNB2 may be examples of aspects of base station 105 as described with reference to FIG. 1. The first UE UE1 and the second UE UE2 may be examples of aspects of UE 115 as described with reference to FIG. 1.

The first base station gNB1 may transmit a first RTS signal 1005. The first RTS signal 1005 may be transmitted on a first downlink channel 1010. In response, the first UE UE1 may transmit a first CTS signal 1015. The first CTS signal 1015 may be transmitted on a first uplink channel 1020.

The second base station gNB2 may transmit a second RTS signal 1025. The second RTS signal 1025 may be precoded by a transmit precoder W based at least in part on a covariance of a received signal N(t, Tx). The second RTS signal may be transmitted on a second downlink channel 1030. In response, the second UE UE2 may transmit a second CTS signal 1035. The second CTS signal 1035 may be precoded by a receive filter $P_2$ based at least in part on a covariance of a received signal N(t, Rx). The second CTS signal may be transmitted on a second uplink channel 1040.

In some examples, the downlink channels 1010, 1030 and uplink channels 1020, 1040 may be aligned between the links, such that the two links can co-exist without interfering with each other. In such cases, the covariance of the received signal at the second base station gNB2 may be constructed based at least in part on the received signal, or may be synthesized based at least in part on the first CTS signal 1015 and their network allocation vectors. For example, the second base station gNB2 may calculate its N(t, Tx) based at least in part on the first CTS signal 1015. The second base station gNB2 may apply N(t, Tx) in its medium sensing filter, RTS precoder, downlink precoder, and receive filter for CTS and uplink reception.

The covariance of the received signal at the second UE UE2 may be constructed based at least in part on the received signal or may be synthesized based at least in part on the first RTS signal 1005. For example, the second UE UE2 may calculate N(t, Rx) based at least in part on the RTS signal 1005. The second UE UE2 may apply the N(t, Rx) in its receive filter for RTS and downlink reception, and in its CTS precoder and uplink precoder.

Figure 11:
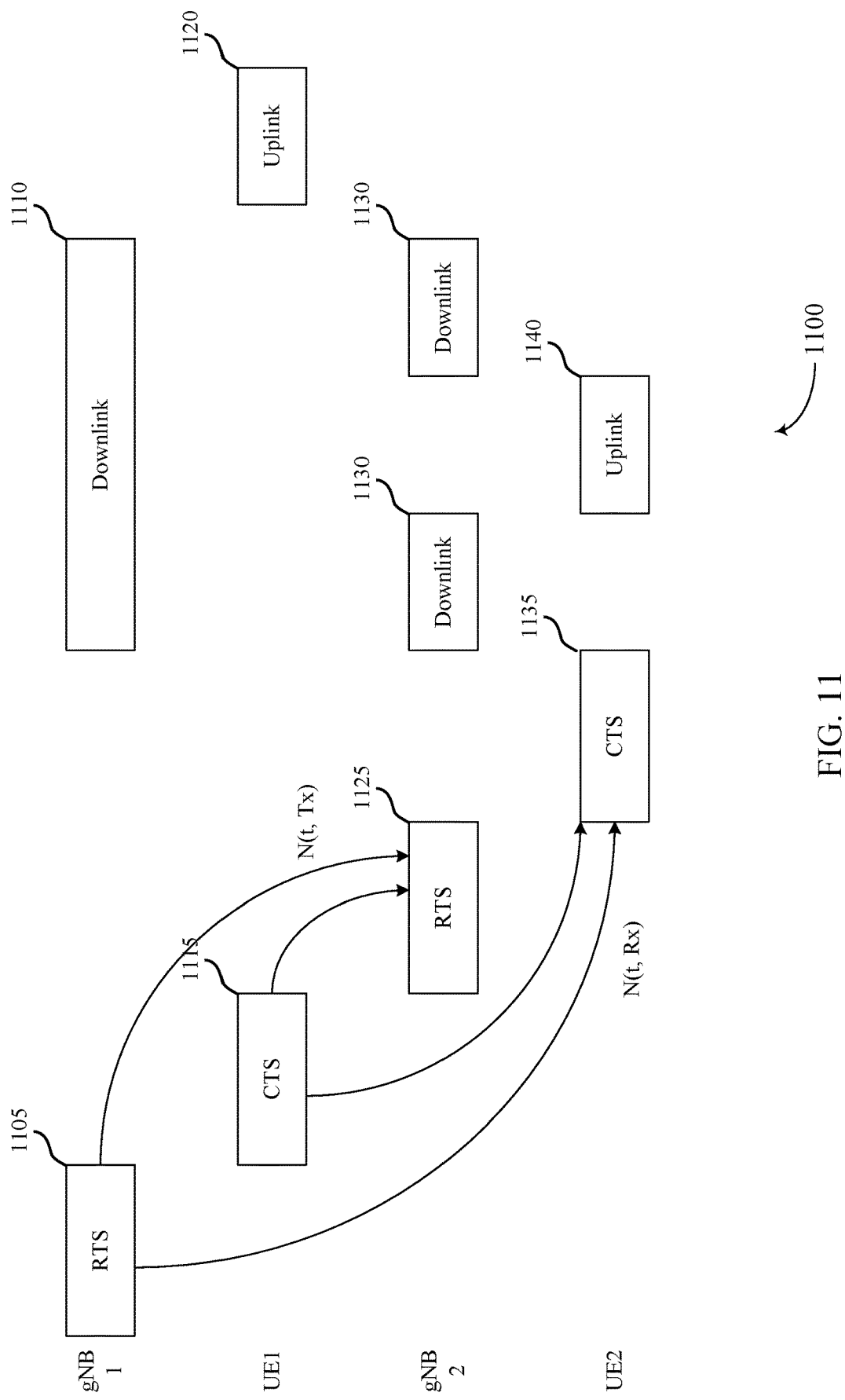
FIG. 11 illustrates an example of signal transmission in a wireless communications network that supports spatial listen before talk by precoded request to send and clear to send via whitening in accordance with aspects of the present disclosure.

FIG. 11 illustrates an example of signal transmission 1100 in a wireless communications network that supports spatial listen before talk by precoded request to send and clear to send via whitening in accordance with various aspects of the present disclosure. In some examples, the wireless communications network may implement aspects of wireless communications system 100.

The wireless communications network may include a first base station gNB1, a first UE UE1, a second base station gNB2, and a second UE UE2. The first base station gNB1 and the second base station gNB2 may be examples of aspects of base station 105 as described with reference to FIG. 1. The first UE UE1 and the second UE UE2 may be examples of aspects of UE 115 as described with reference to FIG. 1.

The first base station gNB1 may transmit a first RTS signal 1105. The first RTS signal 1105 may be transmitted on a first downlink channel 1110. In response, the first UE UE1 may transmit a first CTS signal 1115. The first CTS signal 1115 may be transmitted on a first uplink channel 1120.

The second base station gNB2 may transmit a second RTS signal 1125. The second RTS signal 1125 may be precoded by a transmit precoder W based at least in part on a covariance of a received signal N(t, Tx). The second RTS signal may be transmitted on a second downlink channel 1130. In response, the second UE UE2 may transmit a second CTS signal 1135. The second CTS signal 1135 may be precoded by a receive filter $P_2$ based at least in part on a covariance of a received signal N(t, Rx). The second CTS signal may be transmitted on a second uplink channel 1140.

In some examples, the downlink and uplink channels may not be aligned between the links. For example, the downlink channel 1110 may not be aligned with the uplink channel 1140. In such examples, the covariance of the received signal at the second base station gNB2 N(t, Tx) may be synthesized based at least in part on the first RTS signal 1105 and the first CTS signal 1115. The covariance of the received signal at the second UE UE2 N(t, Rx) may be synthesized based at least in part on the first RTS signal 1105 and the first CTS signal 1115.

Figure 12:
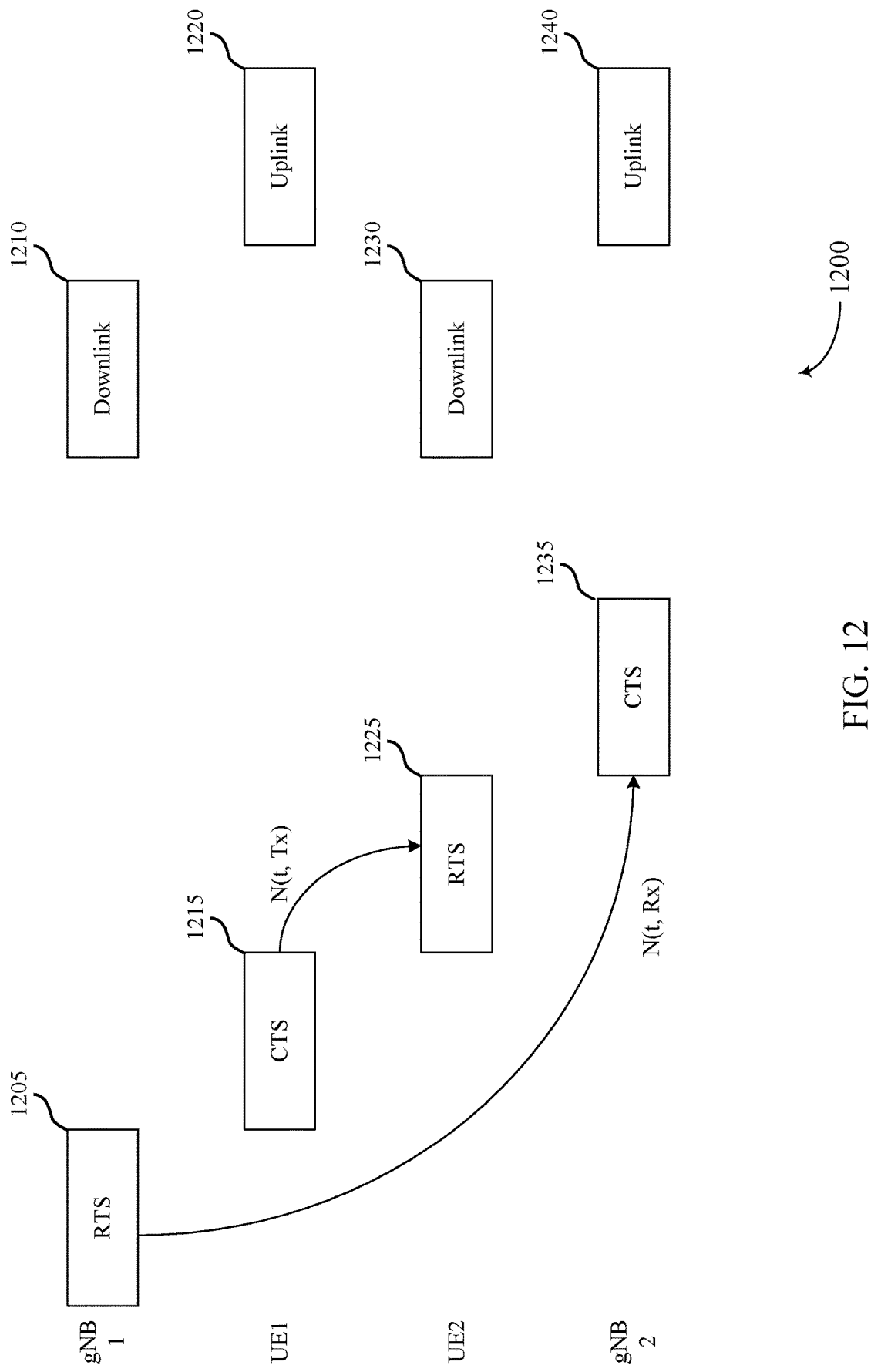
FIG. 12 illustrates an example of signal transmission in a wireless communications network that supports spatial listen before talk by precoded request to send and clear to send via whitening in accordance with aspects of the present disclosure.

FIG. 12 illustrates an example of signal transmission 1200 in a wireless communications network that supports spatial listen before talk by precoded request to send and clear to send via whitening in accordance with various aspects of the present disclosure. In some examples, the wireless communications network may implement aspects of wireless communications system 100.

The wireless communications network may include a first base station gNB1, a first UE UE1, a second base station gNB2, and a second UE UE2. The first base station gNB1 and the second base station gNB2 may be examples of aspects of base station 105 as described with reference to FIG. 1. The first UE UE1 and the second UE UE2 may be examples of aspects of UE 115 as described with reference to FIG. 1.

The first base station gNB1 may transmit a first RTS signal 1205. The first RTS signal 1205 may be transmitted on a first downlink channel 1210. In response, the first UE UE1 may transmit a first CTS signal 1215. The first CTS signal 1215 may be transmitted on a first uplink channel 1220.

In some examples, the second UE UE2 may initiate an uplink transmission (autonomous uplink). The second UE UE2 may transmit a second RTS signal 1225. The second RTS signal 1225 may be precoded by a transmit precoder W based at least in part on a covariance of a received signal N(t, Tx). The second RTS signal may be transmitted on a second downlink channel 1230. In response, the second base station gNB2 may transmit a second CTS signal 1235. The second CTS signal 1235 may be precoded by a receive filter P2 based at least in part on a covariance of a received signal N(t, Rx). The second CTS signal 1235 may be transmitted on a second uplink channel 1240.

In some examples, the downlink channels 1210, 1230 and uplink channels 1220, 1240 may be aligned between the links, such that the two links can co-exist without interfering with each other. In such cases, the covariance of the received signal at the second UE UE2 may be constructed based at least in part on the received signal, or may be synthesized based at least in part on the first CTS signal 1215 and their network allocation vectors. For example, the second UE UE2 may calculate its N(t, Tx) based at least in part on the first CTS signal 1215. The second UE UE2 may apply N(t, Tx) in its medium sensing filter, RTS precoder, downlink precoder, and receive filter for CTS and uplink reception.

The covariance of the received signal at the second base station gNB2 may be constructed based at least in part on the received signal or may be synthesized based at least in part on the first RTS signal 1205. For example, the second base station gNB2 may calculate N(t, Rx) based at least in part on the RTS signal 1205. The second base station gNB2 may apply the N(t, Rx) in its receive filter for RTS and downlink reception, and in its CTS precoder and uplink precoder.

Figure 13:
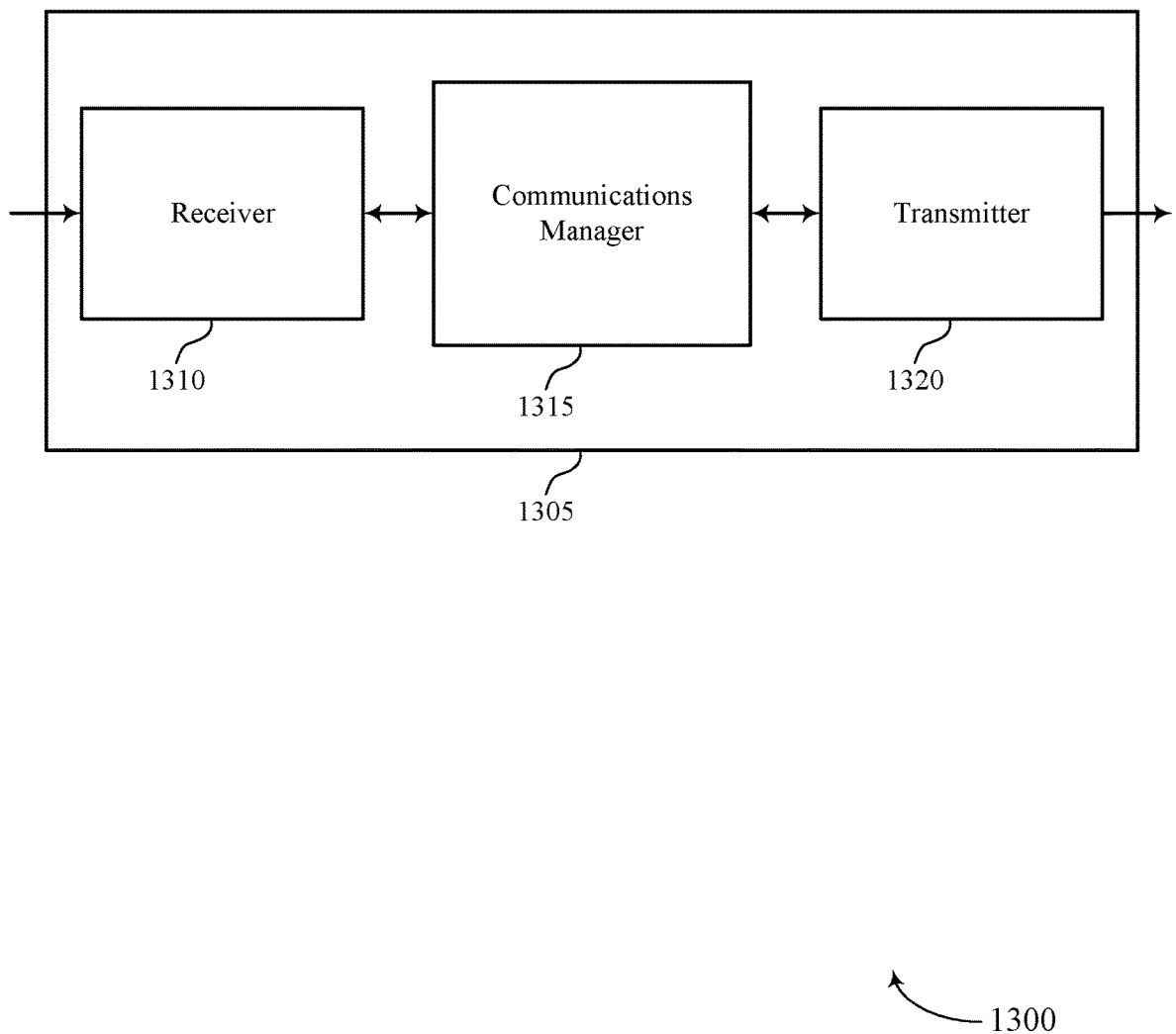
FIGS. 13 through 15 show block diagrams of a device that supports spatial listen before talk by precoded request to send and clear to send via whitening in accordance with aspects of the present disclosure.

FIG. 13 shows a block diagram 1300 of a wireless device 1305 that supports spatial listen before talk by precoded request to send and clear to send via whitening in accordance with aspects of the present disclosure. Wireless device 1305 may be an example of aspects of a base station 105 or UE 115 as described herein. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to spatial listen before talk by precoded request to send and clear to send via whitening, etc.). Information may be passed on to other components of the device. The receiver 1310 may be an example of aspects of the transceiver 1635 described with reference to FIG. 16. The receiver 1310 may utilize a single antenna or a set of antennas.

Communications manager 1315 may be an example of aspects of the communications manager 1615 described with reference to FIG. 16.

Communications manager 1315 and/or at least some of its various sub-components may be implemented in hardware, software executed by a processor, firmware, or any combination thereof. If implemented in software executed by a processor, the functions of the communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1315 and/or at least some of its various sub-components may be physically located at various positions, including being distributed such that portions of functions are implemented at different physical locations by one or more physical devices. In some examples, communications manager 1315 and/or at least some of its various sub-components may be a separate and distinct component in accordance with various aspects of the present disclosure. In other examples, communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1315 may receive, from a first wireless communication device, a clear to send signal, the clear to send signal indicating a receiver spatial filter of the first wireless communication device, determine, by a second wireless communication device, a transmit precoder based on the receiver spatial filter of the first wireless communication device, precode a request to send signal based on the transmit precoder, and transmit the precoded request to send signal on a shared radio frequency spectrum band. The communications manager 1315 may also receive, at a wireless communication device, a signal indicating request to send precoded with a transmitter precoder, determine a receiver precoder based on the signal indicating request to send precoded with the transmitter precoder, and transmit a signal indicating clear to send precoded with the receiver precoder. The communications manager 1315 may also perform a transpose operation on a receiver spatial filter of a wireless communication device to obtain a transpose of the receiver spatial filter, precode, by the wireless communication device, a clear to send signal based on the transpose of the receiver spatial filter of the wireless communication device, and transmit the precoded clear to send signal over a shared radio frequency spectrum band.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Transmitter 1320 may transmit, to the third wireless communication device, a data signal.

Figure 14:
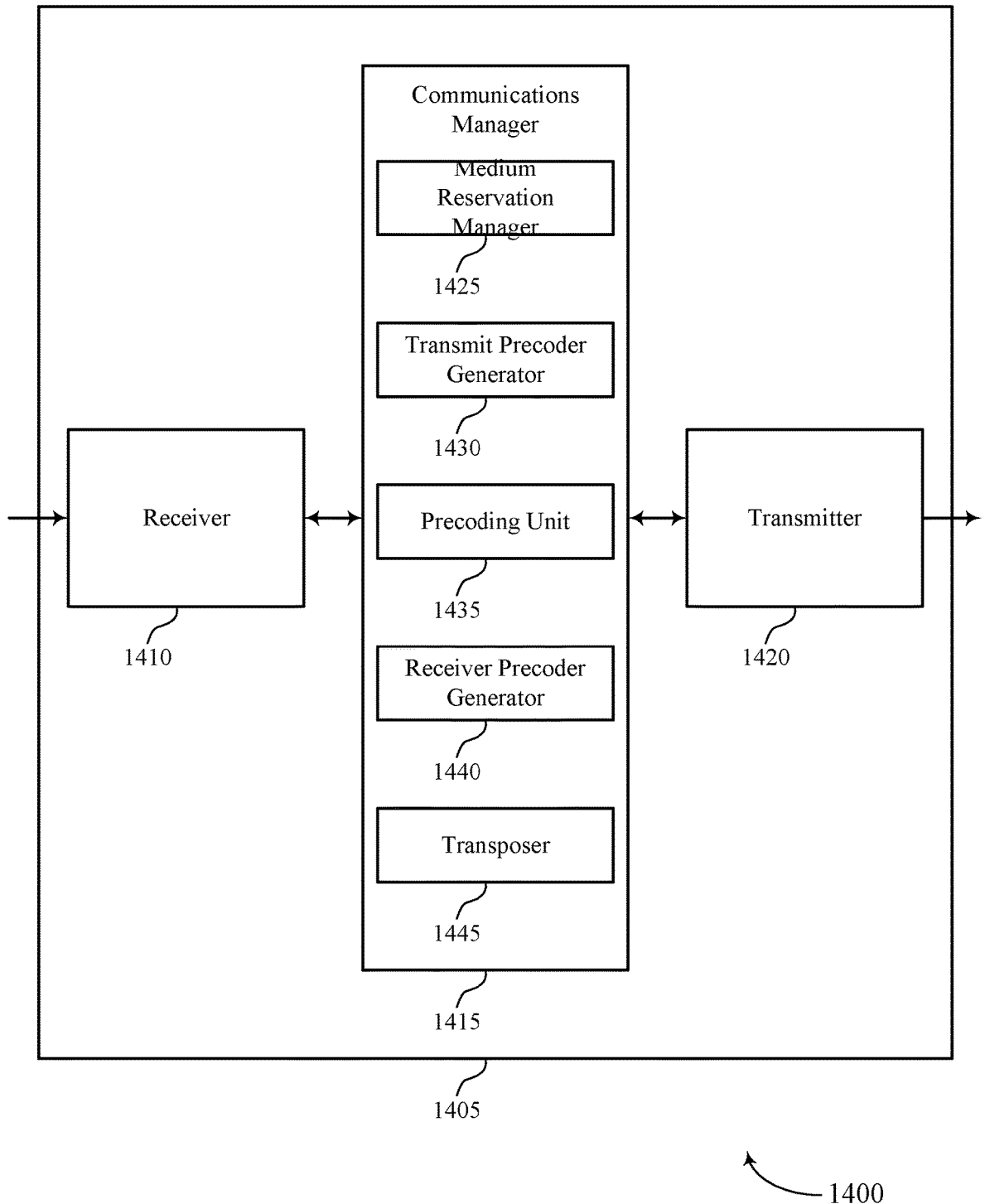

FIG. 14 shows a block diagram 1400 of a wireless device 1405 that supports spatial listen before talk by precoded request to send and clear to send via whitening in accordance with aspects of the present disclosure. Wireless device 1405 may be an example of aspects of a wireless device 1305 or a wireless device such as base station 105 or UE 115 as described with reference to FIG. 13. Wireless device 1405 may include receiver 1410, communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to spatial listen before talk by precoded request to send and clear to send via whitening, etc.). Information may be passed on to other components of the device. The receiver 1410 may be an example of aspects of the transceiver 1635 described with reference to FIG. 16. The receiver 1410 may utilize a single antenna or a set of antennas.

Communications manager 1415 may be an example of aspects of the communications manager 1615 described with reference to FIG. 16.

Communications manager 1415 may also include medium reservation manager 1425, transmit precoder generator 1430, precoding unit 1435, receiver precoder generator 1440, and transposer 1445.

Medium reservation manager 1425 may receive, from a first wireless communication device, a clear to send signal, the clear to send signal indicating a receiver spatial filter of the first wireless communication device, transmit the precoded signal indicating clear to send in response to the signal indicating clear to send, receive, from a third wireless communication device, a second clear to send signal, the second clear to send signal precoded based on a filter derived based on the transmit precoder, transmit the precoded request to send signal, the precoded request to send signal having the initial remaining dimension, receive, from the third wireless communication device, a second clear to send signal, transmit the precoded request to send signal on a shared radio frequency spectrum band, receive, at a wireless communication device, a signal indicating request to send precoded with a transmitter precoder, transmit a signal indicating clear to send precoded with the receiver precoder, transmit the precoded clear to send signal over a shared radio frequency spectrum band, and receive a request to send signal.

Transmit precoder generator 1430 may determine, by a second wireless communication device, a transmit precoder based on the receiver spatial filter of the first wireless communication device, select the one of the one or more transmit precoder candidates based on the covariance value, determine the transmit precoder is based on the whitening filter, and construct the whitening filter based on a data signal received from the first wireless device. In some cases, determining the transmit precoder includes: identifying one or more transmit precoder candidates. In some cases, the method further includes selecting one of the one or more transmit precoder candidates based on a detection threshold. In some cases, the method further includes determining a covariance value for each of the one or more transmit precoder candidates based on the transpose of each of the one or more precoder candidates and the clear to send signal. In some cases, the transmit precoder includes a whitening filter.

Precoding unit 1435 may precode a request to send signal based on the transmit precoder and precode, by the wireless communication device, a clear to send signal based on the transpose of the receiver spatial filter of the wireless communication device.

Receiver precoder generator 1440 may determine a receiver precoder based on the signal indicating request to send precoded with the transmitter precoder and determine the receiver precoder based on the receive filter. In some cases, the receiver precoder includes a transpose of the receive filter.

Transposer 1445 may perform a transpose operation on a receiver spatial filter of a wireless communication device to obtain a transpose of the receiver spatial filter. In some cases, selecting one of the one or more transmit precoder candidates includes: calculating a transpose of each of the one or more transmit precoder candidates.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
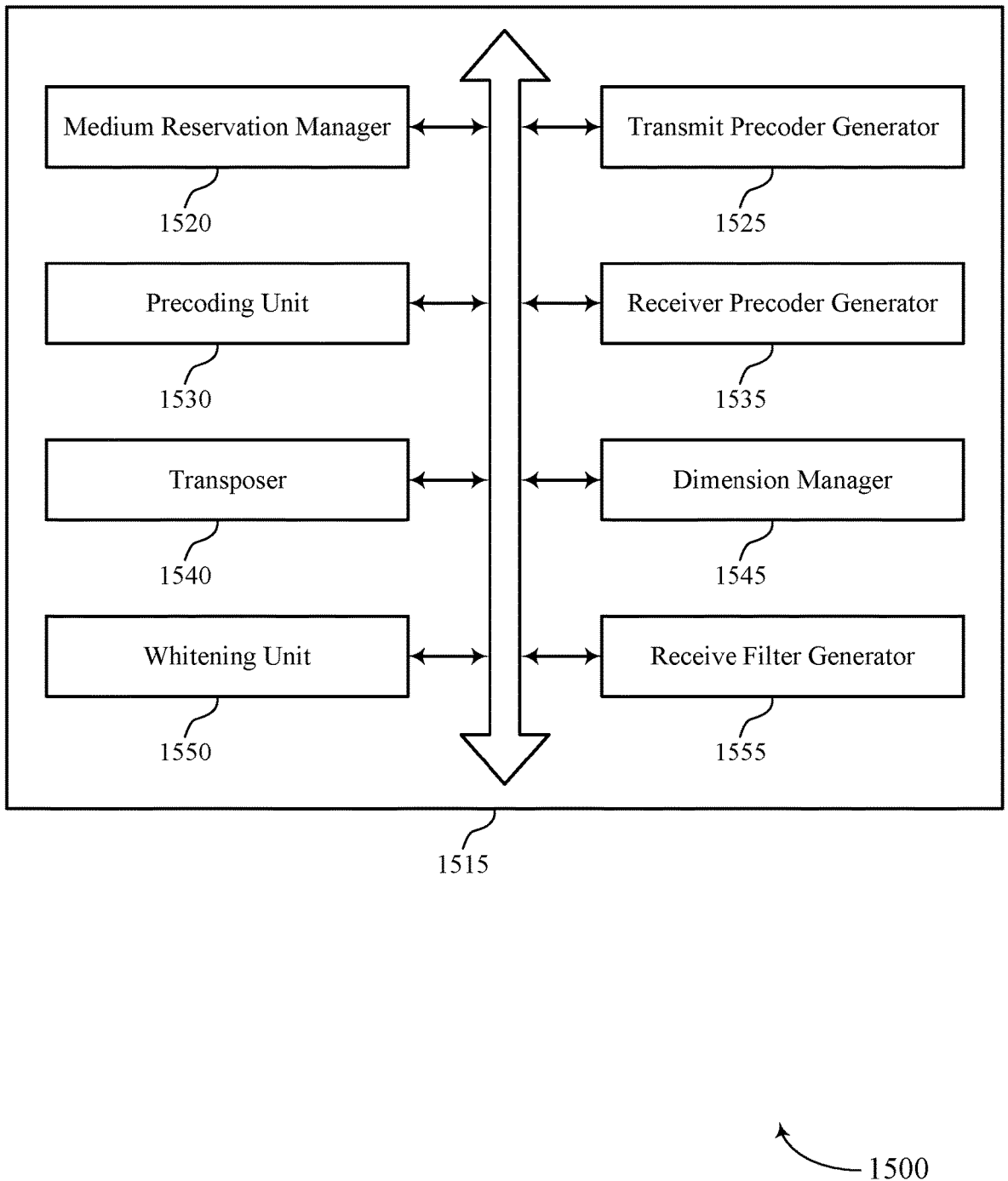

FIG. 15 shows a block diagram 1500 of a communications manager 1515 that supports spatial listen before talk by precoded request to send and clear to send via whitening in accordance with aspects of the present disclosure. The communications manager 1515 may be an example of aspects of a communications manager 1315, a communications manager 1415, or a communications manager 1615 described with reference to FIGS. 13, 14, and 16. The communications manager 1515 may include medium reservation manager 1520, transmit precoder generator 1525, precoding unit 1530, receiver precoder generator 1535, transposer 1540, dimension manager 1545, whitening unit 1550, and receive filter generator 1555. Each of these modules may communicate, directly or indirectly, with one another (e.g., via one or more buses).

Medium reservation manager 1520 may receive, from a first wireless communication device, a clear to send signal, the clear to send signal indicating a receiver spatial filter of the first wireless communication device, transmit the precoded signal indicating clear to send in response to the signal indicating clear to send, receive, from a third wireless communication device, a second clear to send signal, the second clear to send signal precoded based on a filter derived based on the transmit precoder, transmit the precoded request to send signal, the precoded request to send signal having the initial remaining dimension, receive, from the third wireless communication device, a second clear to send signal, transmit the precoded request to send signal on a shared radio frequency spectrum band, receive, at a wireless communication device, a signal indicating request to send precoded with a transmitter precoder, transmit a signal indicating clear to send precoded with the receiver precoder, transmit the precoded clear to send signal over a shared radio frequency spectrum band, and receive a request to send signal.

Transmit precoder generator 1525 may determine, by a second wireless communication device, a transmit precoder based on the receiver spatial filter of the first wireless communication device, select the one of the one or more transmit precoder candidates based on the covariance value, determine the transmit precoder is based on the whitening filter, and construct the whitening filter based on a data signal received from the first wireless device. In some cases, determining the transmit precoder includes: identifying one or more transmit precoder candidates. In some cases, the method further includes selecting one of the one or more transmit precoder candidates based on a detection threshold. In some cases, the method further includes determining a covariance value for each of the one or more transmit precoder candidates based on the transpose of each of the one or more precoder candidates and the clear to send signal. In some cases, the transmit precoder includes a whitening filter.

Precoding unit 1530 may precode a request to send signal based on the transmit precoder and precode, by the wireless communication device, a clear to send signal based on the transpose of the receiver spatial filter of the wireless communication device.

Receiver precoder generator 1535 may determine a receiver precoder based on the signal indicating request to send precoded with the transmitter precoder and determine the receiver precoder based on the receive filter. In some cases, the receiver precoder includes a transpose of the receive filter.

Transposer 1540 may perform a transpose operation on a receiver spatial filter of a wireless communication device to obtain a transpose of the receiver spatial filter. In some cases, selecting one of the one or more transmit precoder candidates includes: calculating a transpose of each of the one or more transmit precoder candidates.

Dimension manager 1545 may determine a dimension of the clear to send signal, identify a remaining dimension for data communications based on the dimension of the clear to send signal, transmit a data signal to the third wireless communication device, the data signal having the remaining dimension, determine an initial remaining dimension based on the dimension of the clear to send signal and an available dimension for communications between the second wireless communication device and a third wireless communication device, determine the remaining dimension based on the initial remaining dimension and a dimension of the second clear to send signal, and determine the remaining dimension based on a dimension of the second clear to send signal.

Whitening unit 1550 may construct the whitening filter based on one of the clear to send signal or a network allocation vector associated with the clear to send signal and construct the whitening filter based on the clear to send signal and a preceding request to send signal to which the clear to send signal is responsive.

Receive filter generator 1555 may determine a receive filter based on the signal indicating request to send precoded with the transmitter precoder.

Figure 16:
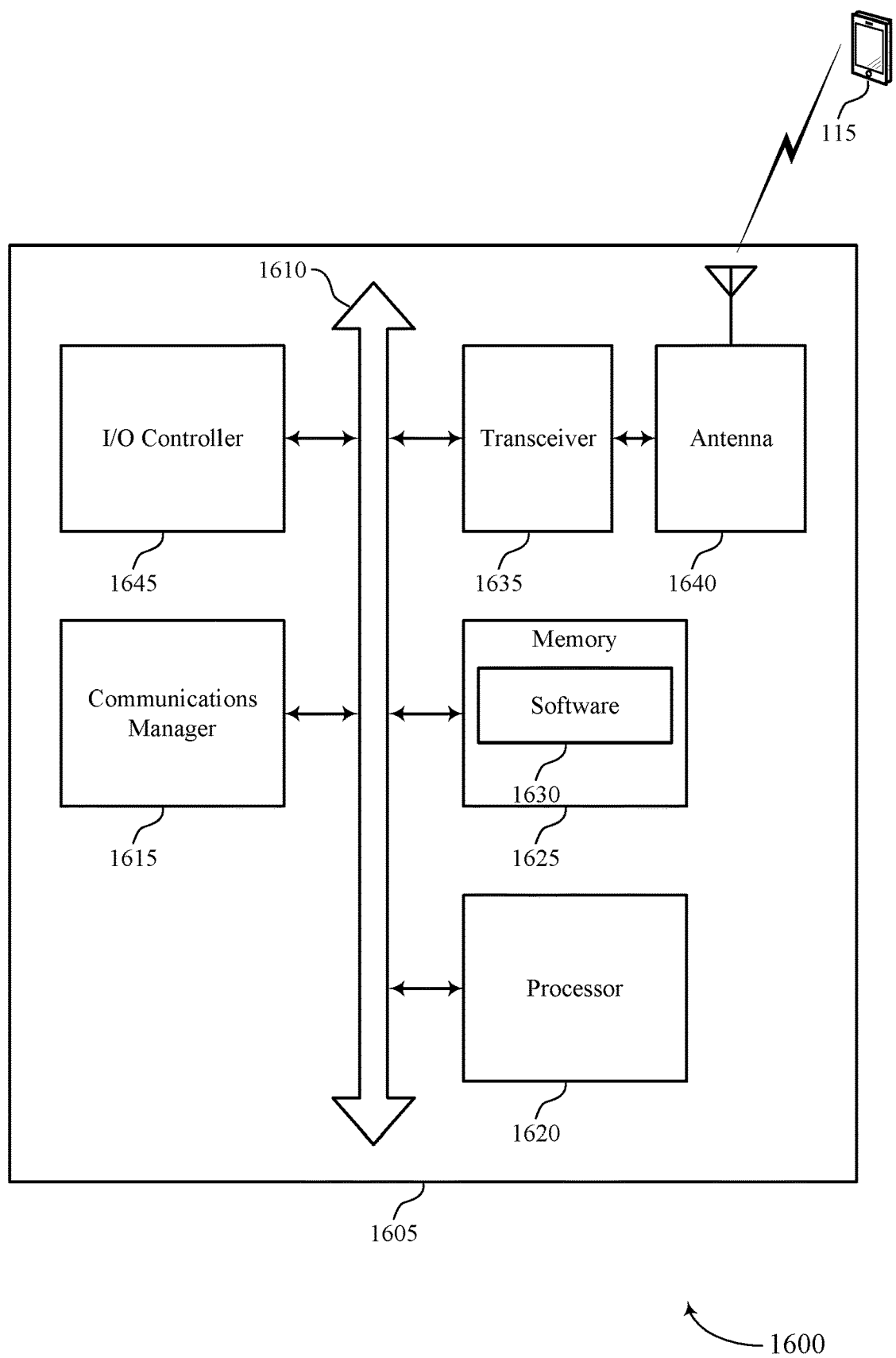
FIG. 16 illustrates a block diagram of a system including a wireless device that supports spatial listen before talk by precoded request to send and clear to send via whitening in accordance with aspects of the present disclosure.

FIG. 16 shows a diagram of a system 1600 including a device 1605 that supports spatial listen before talk by precoded request to send and clear to send via whitening in accordance with aspects of the present disclosure. Device 1605 may be an example of or include the components of wireless device 1305, wireless device 1405, or a wireless device such as base station 105 or UE 115 as described above, e.g., with reference to FIGS. 13 and 14. Device 1605 may include components for bi-directional voice and data communications including components for transmitting and receiving communications, including communications manager 1615, processor 1620, memory 1625, software 1630, transceiver 1635, antenna 1640, and I/O controller 1645. These components may be in electronic communication via one or more buses (e.g., bus 1610).

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting spatial listen before talk by precoded request to send and clear to send via whitening).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support spatial listen before talk by precoded request to send and clear to send via whitening. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
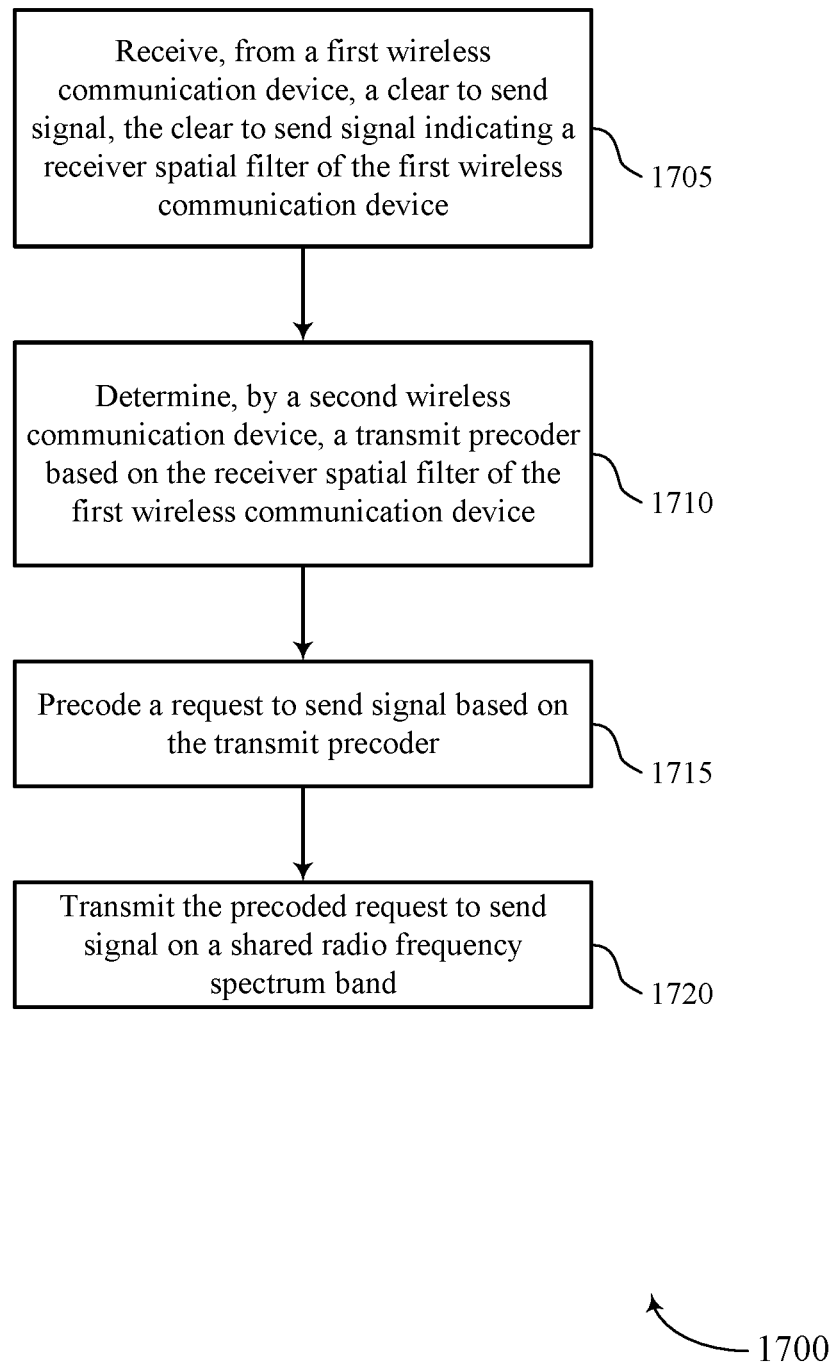
FIGS. 17 through 19 illustrate methods for spatial listen before talk by precoded request to send and clear to send via whitening in accordance with aspects of the present disclosure.

FIG. 17 shows a flowchart illustrating a method 1700 for spatial listen before talk by precoded request to send and clear to send via whitening in accordance with aspects of the present disclosure. The operations of method 1700 may be implemented by a wireless device, such as base station 105 or UE 115, or its components as described herein. For example, the operations of method 1700 may be performed by a communications manager as described with reference to FIGS. 13 through 16. In some examples, a wireless device such as base station 105 or UE 115 may execute a set of codes to control the functional elements of the device to perform the functions described below. Additionally or alternatively, the wireless device such as base station 105 or UE 115 may perform aspects of the functions described below using special-purpose hardware.

At block 1705 the wireless device such as base station 105 or UE 115 may receive, from a first wireless communication device, a clear to send signal, the clear to send signal indicating a receiver spatial filter of the first wireless communication device. The operations of block 1705 may be performed according to the methods described herein. In certain examples, aspects of the operations of block 1705 may be performed by a medium reservation manager as described with reference to FIGS. 13 through 16.

At block 1710 the wireless device such as base station 105 or UE 115 may determine, by a second wireless communication device, a transmit precoder based at least in part on the receiver spatial filter of the first wireless communication device. The operations of block 1710 may be performed according to the methods described herein. In certain examples, aspects of the operations of block 1710 may be performed by a transmit precoder generator as described with reference to FIGS. 13 through 16.

At block 1715 the wireless device such as base station 105 or UE 115 may precode a request to send signal based at least in part on the transmit precoder. The operations of block 1715 may be performed according to the methods described herein. In certain examples, aspects of the operations of block 1715 may be performed by a precoding unit as described with reference to FIGS. 13 through 16.

At block 1720 the wireless device such as base station 105 or UE 115 may transmit the precoded request to send signal on a shared radio frequency spectrum band. The operations of block 1720 may be performed according to the methods described herein. In certain examples, aspects of the operations of block 1720 may be performed by a medium reservation manager as described with reference to FIGS. 13 through 16.

Figure 18:
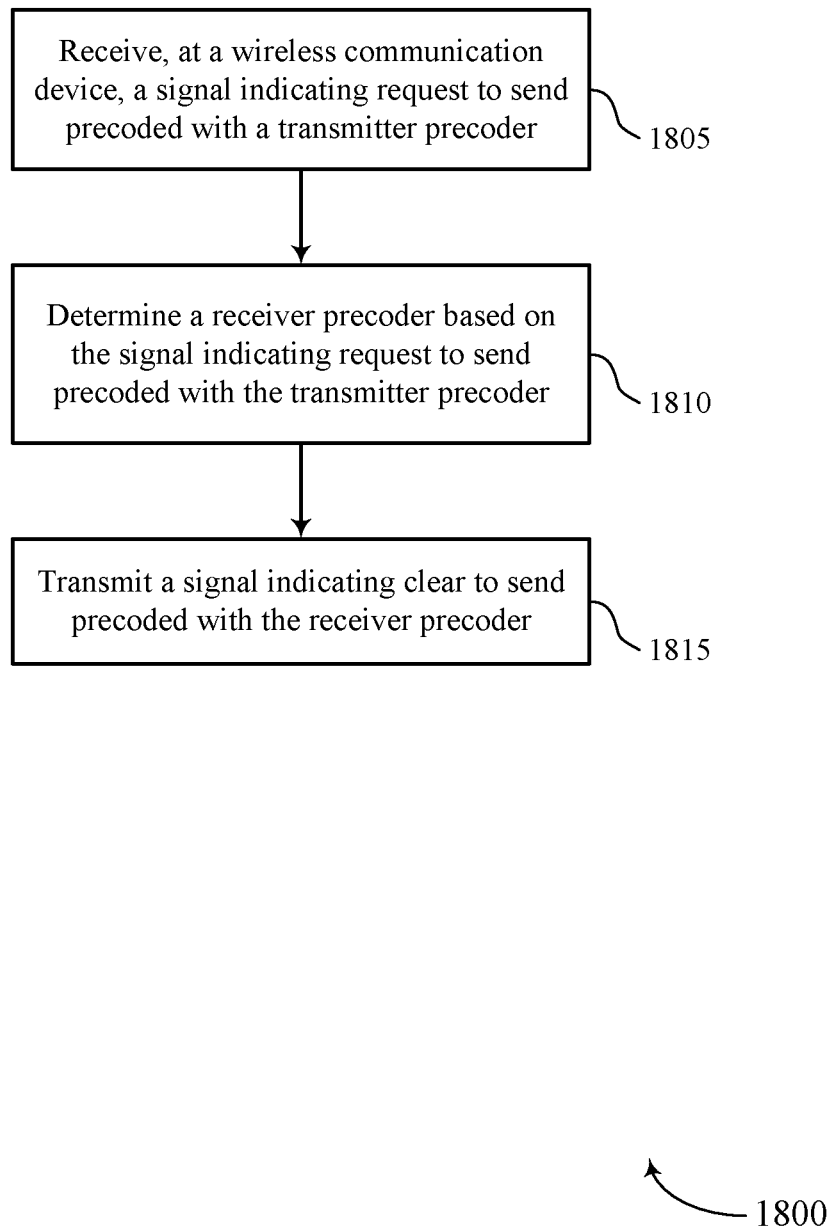

FIG. 18 shows a flowchart illustrating a method 1800 for spatial listen before talk by precoded request to send and clear to send via whitening in accordance with aspects of the present disclosure. The operations of method 1800 may be implemented by a wireless device, such as base station 105 or UE 115, or its components as described herein. For example, the operations of method 1800 may be performed by a communications manager as described with reference to FIGS. 13 through 16. In some examples, a wireless device such as base station 105 or UE 115 may execute a set of codes to control the functional elements of the device to perform the functions described below. Additionally or alternatively, the wireless device such as base station 105 or UE 115 may perform aspects of the functions described below using special-purpose hardware.

At block 1805 the wireless device such as base station 105 or UE 115 may receive, at a wireless communication device, a signal indicating request to send precoded with a transmitter precoder. The operations of block 1805 may be performed according to the methods described herein. In certain examples, aspects of the operations of block 1805 may be performed by a medium reservation manager as described with reference to FIGS. 13 through 16.

At block 1810 the wireless device such as base station 105 or UE 115 may determine a receiver precoder based at least in part on the signal indicating request to send precoded with the transmitter precoder. The operations of block 1810 may be performed according to the methods described herein. In certain examples, aspects of the operations of block 1810 may be performed by a receiver precoder generator as described with reference to FIGS. 13 through 16.

At block 1815 the wireless device such as base station 105 or UE 115 may transmit a signal indicating clear to send precoded with the receiver precoder. The operations of block 1815 may be performed according to the methods described herein. In certain examples, aspects of the operations of block 1815 may be performed by a medium reservation manager as described with reference to FIGS. 13 through 16.

Figure 19:
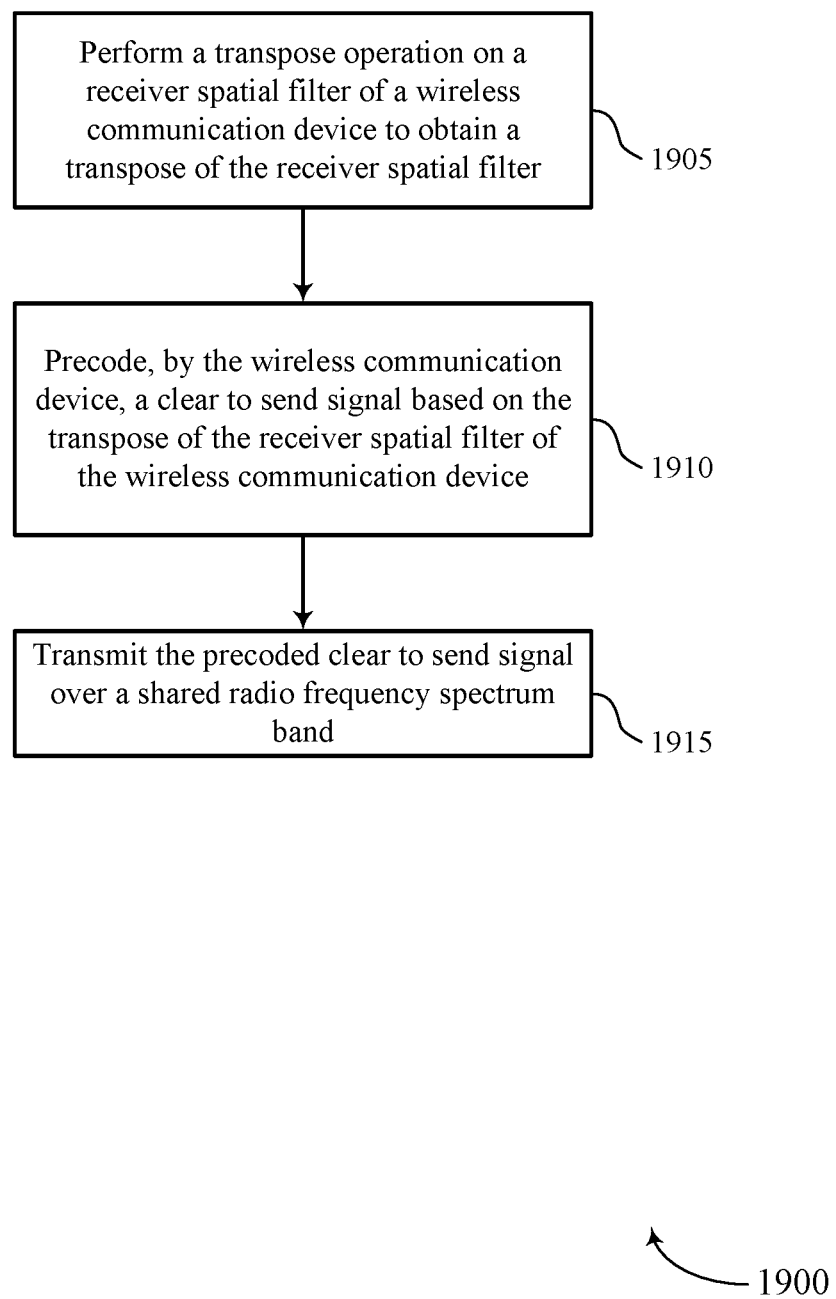

FIG. 19 shows a flowchart illustrating a method 1900 for spatial listen before talk by precoded request to send and clear to send via whitening in accordance with aspects of the present disclosure. The operations of method 1900 may be implemented by a wireless device, such as base station 105 or UE 115, or its components as described herein. For example, the operations of method 1900 may be performed by a communications manager as described with reference to FIGS. 13 through 16. In some examples, a wireless device such as base station 105 or UE 115 may execute a set of codes to control the functional elements of the device to perform the functions described below. Additionally or alternatively, the wireless device such as base station 105 or UE 115 may perform aspects of the functions described below using special-purpose hardware.

At block 1905 the wireless device such as base station 105 or UE 115 may perform a transpose operation on a receiver spatial filter of a wireless communication device to obtain a transpose of the receiver spatial filter. The operations of block 1905 may be performed according to the methods described herein. In certain examples, aspects of the operations of block 1905 may be performed by a transposer as described with reference to FIGS. 13 through 16.

At block 1910 the wireless device such as base station 105 or UE 115 may precode, by the wireless communication device, a clear to send signal based at least in part on the transpose of the receiver spatial filter of the wireless communication device. The operations of block 1910 may be performed according to the methods described herein. In certain examples, aspects of the operations of block 1910 may be performed by a precoding unit as described with reference to FIGS. 13 through 16.

At block 1915 the wireless device such as base station 105 or UE 115 may transmit the precoded clear to send signal over a shared radio frequency spectrum band. The operations of block 1915 may be performed according to the methods described herein. In certain examples, aspects of the operations of block 1915 may be performed by a medium reservation manager as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, from a first wireless communication device, a clear to send signal, the clear to send signal indicating a receiver spatial filter of the first wireless communication device;
determining, by a second wireless communication device, a transmit precoder based at least in part on the receiver spatial filter of the first wireless communication device;
precoding a request to send signal based at least in part on the transmit precoder;
transmitting the precoded request to send signal on a shared radio frequency spectrum band;
determining a remaining dimension for data communications based on a dimension of the clear to send signal; and
transmitting a data signal to a third wireless communication device, the data signal having the remaining dimension.

2. The method of claim 1, wherein:
determining the transmit precoder comprises: identifying one or more transmit precoder candidates; and
the method further comprising and selecting one of the one or more transmit precoder candidates based at least in part on a detection threshold.

3. The method of claim 2, wherein:
selecting one of the one or more transmit precoder candidates comprises:
calculating a transpose of each of the one or more transmit precoder candidates;
the method further comprising determining a covariance value for each of the one or more transmit precoder candidates based at least in part on the transpose of each of the one or more precoder candidates and the clear to send signal; and
selecting the one of the one or more transmit precoder candidates based at least in part on the covariance value.

4. The method of claim 1, further comprising:
receiving, from the third wireless communication device, a second clear to send signal, the second clear to send signal precoded based at least in part on a filter derived based at least in part on the transmit precoder.

5. The method of claim 4, further comprising:
transmitting, to the third wireless communication device, a data signal.

6. The method of claim 1, further comprising:
determining an initial remaining dimension based at least in part on the dimension of the clear to send signal and an available dimension for communications between the second wireless communication device and the third wireless communication device;
transmitting the precoded request to send signal, the precoded request to send signal having the initial remaining dimension;
receiving, from the third wireless communication device, a second clear to send signal; and
determining the remaining dimension based at least in part on the initial remaining dimension and a dimension of the second clear to send signal.

7. The method of claim 1, further comprising:
determining an initial remaining dimension based at least in part on the dimension of the clear to send signal and an available dimension for communications between the second wireless communication device and the third wireless communication device;
transmitting the precoded request to send signal, the precoded request to send signal having the initial remaining dimension;
receiving, from the third wireless communication device, a second clear to send signal; and
determining the remaining dimension based at least in part on a dimension of the second clear to send signal.

8. The method of claim 1, wherein:
the transmit precoder comprises a whitening filter.

9. The method of claim 8, further comprising:
determining the transmit precoder is based at least in part on the whitening filter.

10. The method of claim 8, further comprising:
constructing the whitening filter based at least in part on a data signal received from the first wireless device.

11. The method of claim 8, further comprising:
constructing the whitening filter based at least in part on one of the clear to send signal or a network allocation vector associated with the clear to send signal.

12. The method of claim 8, further comprising:
constructing the whitening filter based at least in part on the clear to send signal and a preceding request to send signal to which the clear to send signal is responsive.

13. A method for wireless communication, comprising:
receiving, at a wireless communication device, a signal indicating request to send precoded with a transmitter precoder;
determining a receiver precoder based at least in part on the signal indicating request to send precoded with the transmitter precoder;
transmitting a signal indicating clear to send precoded with the receiver precoder; and
receiving, at the wireless communication device, a data signal having a remaining dimension for data communications based on a dimension of a clear to send signal from a second wireless communication device.

14. The method of claim 13, further comprising:
determining a receive filter based at least in part on the signal indicating request to send precoded with the transmitter precoder; and
determining the receiver precoder based at least in part on the receive filter.

15. The method of claim 14, wherein:
the receiver precoder comprises a transpose of the receive filter.

16. An apparatus for wireless communication, comprising:
means for receiving, from a first wireless communication device, a clear to send signal, the clear to send signal indicating a receiver spatial filter of the first wireless communication device;
means for determining, by a second wireless communication device, a transmit precoder based at least in part on the receiver spatial filter of the first wireless communication device;
means for precoding a request to send signal based at least in part on the transmit precoder;
means for transmitting the precoded request to send signal on a shared radio frequency spectrum band;
means for determining a remaining dimension for data communications based on a dimension of the clear to send signal; and
means for transmitting a data signal to a third wireless communication device, the data signal having the remaining dimension.

17. The apparatus of claim 16, wherein:
determining the transmit precoder comprises: identifying one or more transmit precoder candidates; and
the apparatus further comprising means for and selecting one of the one or more transmit precoder candidates based at least in part on a detection threshold.

18. The apparatus of claim 17, wherein:
selecting one of the one or more transmit precoder candidates comprises:
calculating a transpose of each of the one or more transmit precoder candidates;
the apparatus further comprising means for determining a covariance value for each of the one or more transmit precoder candidates based at least in part on the transpose of each of the one or more precoder candidates and the clear to send signal; and means for selecting the one of the one or more transmit precoder candidates based at least in part on the covariance value.

19. The apparatus of claim 16, further comprising:
means for receiving, from the third wireless communication device, a second clear to send signal, the second clear to send signal precoded based at least in part on a filter derived based at least in part on the transmit precoder.

20. The apparatus of claim 19, further comprising:
means for transmitting, to the third wireless communication device, a data signal.

21. The apparatus of claim 16, further comprising:
means for determining an initial remaining dimension based at least in part on the dimension of the clear to send signal and an available dimension for communications between the second wireless communication device and the third wireless communication device;
means for transmitting the precoded request to send signal, the precoded request to send signal having the initial remaining dimension;
means for receiving, from the third wireless communication device, a second clear to send signal; and
means for determining the remaining dimension based at least in part on the initial remaining dimension and a dimension of the second clear to send signal.

22. The apparatus of claim 16, further comprising:
means for determining an initial remaining dimension based at least in part on the dimension of the clear to send signal and an available dimension for communications between the second wireless communication device and the third wireless communication device;
means for transmitting the precoded request to send signal, the precoded request to send signal having the initial remaining dimension;
means for receiving, from the third wireless communication device, a second clear to send signal; and
means for determining the remaining dimension based at least in part on a dimension of the second clear to send signal.

23. The apparatus of claim 16, wherein:
the transmit precoder comprises a whitening filter.

24. The apparatus of claim 23, further comprising:
means for determining the transmit precoder is based at least in part on the whitening filter.

25. The apparatus of claim 23, further comprising:
means for constructing the whitening filter based at least in part on a data signal received from the first wireless device.

26. The apparatus of claim 23, further comprising:
means for constructing the whitening filter based at least in part on one of the clear to send signal or a network allocation vector associated with the clear to send signal.

27. The apparatus of claim 23, further comprising:
means for constructing the whitening filter based at least in part on the clear to send signal and a preceding request to send signal to which the clear to send signal is responsive.

28. An apparatus for wireless communication, comprising:
means for receiving, at a wireless communication device, a signal indicating request to send precoded with a transmitter precoder;
means for determining a receiver precoder based at least in part on the signal indicating request to send precoded with the transmitter precoder;

means for transmitting a signal indicating clear to send precoded with the receiver precoder; and
means for receiving, at the wireless communication device, a data signal having a remaining dimension for data communications based on a dimension of a clear to send signal from a second wireless communication device.

29. The apparatus of claim 28, further comprising:
means for determining a receive filter based at least in part on the signal indicating request to send precoded with the transmitter precoder; and
means for determining the receiver precoder based at least in part on the receive filter.

30. The apparatus of claim 29, wherein:
the receiver precoder comprises a transpose of the receive filter.

31. An apparatus for wireless communication, comprising:
a processor;
memory in electronic communication with the processor; and
instructions stored in the memory and operable, when executed by the processor, to cause the apparatus to:
receive, from a first wireless communication device, a clear to send signal, the clear to send signal indicating a receiver spatial filter of the first wireless communication device;
determine, by a second wireless communication device, a transmit precoder based at least in part on the receiver spatial filter of the first wireless communication device;
precode a request to send signal based at least in part on the transmit precoder;
transmit the precoded request to send signal on a shared radio frequency spectrum band;
determine a remaining dimension for data communications based on a dimension of the clear to send signal; and
transmit a data signal to a third wireless communication device, the data signal having the remaining dimension.

32. The apparatus of claim 31, wherein:
determining the transmit precoder comprises: identifying one or more transmit precoder candidates; and
the instructions are further executable to and select one of the one or more transmit precoder candidates based at least in part on a detection threshold.

33. The apparatus of claim 32, wherein:
selecting one of the one or more transmit precoder candidates comprises:
calculating a transpose of each of the one or more transmit precoder candidates; and
the instructions are further executable to:
determine a covariance value for each of the one or more transmit precoder candidates based at least in part on the transpose of each of the one or more precoder candidates and the clear to send signal; and
select the one of the one or more transmit precoder candidates based at least in part on the covariance value.

34. The apparatus of claim 31, wherein the instructions are further executable by the processor to:
receive, from the third wireless communication device, a second clear to send signal, the second clear to send signal precoded based at least in part on a filter derived based at least in part on the transmit precoder.

35. The apparatus of claim 34, wherein the instructions are further executable by the processor to:
transmit, to the third wireless communication device, a data signal.

36. The apparatus of claim 31, wherein the instructions are further executable by the processor to:
determine an initial remaining dimension based at least in part on the dimension of the clear to send signal and an available dimension for communications between the second wireless communication device and the third wireless communication device;
transmit the precoded request to send signal, the precoded request to send signal having the initial remaining dimension;
receive, from the third wireless communication device, a second clear to send signal; and
determine the remaining dimension based at least in part on the initial remaining dimension and a dimension of the second clear to send signal.

37. The apparatus of claim 31, wherein the instructions are further executable by the processor to:
determine an initial remaining dimension based at least in part on the dimension of the clear to send signal and an available dimension for communications between the second wireless communication device and the third wireless communication device;
transmit the precoded request to send signal, the precoded request to send signal having the initial remaining dimension;
receive, from the third wireless communication device, a second clear to send signal; and
determine the remaining dimension based at least in part on a dimension of the second clear to send signal.

38. The apparatus of claim 31, wherein:
the transmit precoder comprises a whitening filter.

39. The apparatus of claim 38, wherein the instructions are further executable by the processor to:
determine the transmit precoder is based at least in part on the whitening filter.

40. The apparatus of claim 38, wherein the instructions are further executable by the processor to:
construct the whitening filter based at least in part on a data signal received from the first wireless device.

41. The apparatus of claim 38, wherein the instructions are further executable by the processor to:
construct the whitening filter based at least in part on one of the clear to send signal or a network allocation vector associated with the clear to send signal.

42. The apparatus of claim 38, wherein the instructions are further executable by the processor to:
construct the whitening filter based at least in part on the clear to send signal and a preceding request to send signal to which the clear to send signal is responsive.

43. An apparatus for wireless communication, comprising:
a processor;
memory in electronic communication with the processor; and
instructions stored in the memory and operable, when executed by the processor, to cause the apparatus to:
receive, at a wireless communication device, a signal indicating request to send precoded with a transmitter precoder;
determine a receiver precoder based at least in part on the signal indicating request to send precoded with the transmitter precoder;

transmit a signal indicating clear to send precoded with the receiver precoder; and receive, at the wireless communication device, a data signal having a remaining dimension for data communications based on a dimension of a clear to send signal from a second wireless communication device.

44. The apparatus of claim 43, wherein the instructions are further executable by the processor to:

determine a receive filter based at least in part on the signal indicating request to send precoded with the transmitter precoder; and determine the receiver precoder based at least in part on the receive filter.

45. The apparatus of claim 44, wherein:

the receiver precoder comprises a transpose of the receive filter.

46. A non-transitory computer readable medium storing code for wireless communication, the code comprising instructions executable by a processor to:

receive, from a first wireless communication device, a clear to send signal, the clear to send signal indicating a receiver spatial filter of the first wireless communication device;

determine, by a second wireless communication device, a transmit precoder based at least in part on the receiver spatial filter of the first wireless communication device;

precode a request to send signal based at least in part on the transmit precoder;

transmit the precoded request to send signal on a shared radio frequency spectrum band;

determine a remaining dimension for data communications based on a dimension of the clear to send signal; and transmit a data signal to a third wireless communication device, the data signal having the remaining dimension.

47. A non-transitory computer readable medium storing code for wireless communication, the code comprising instructions executable by a processor to:

receive, at a wireless communication device, a signal indicating request to send precoded with a transmitter precoder;

determine a receiver precoder based at least in part on the signal indicating request to send precoded with the transmitter precoder;

transmit a signal indicating clear to send precoded with the receiver precoder; and receive, at the wireless communication device, a data signal having a remaining dimension for data communications based on a dimension of a clear to send signal from a second wireless communication device.

* * * * *